US012731286B2

(12) United States Patent
Zaghetto et al.

(10) Patent No.: US 12,731,286 B2
(45) Date of Patent: Sep. 8, 2026

(54) ESTIMATION OF DENSITY DISTORTION METRIC FOR PROCESSING OF POINT CLOUD GEOMETRY

(71) Applicants: SONY GROUP CORPORATION, Tokyo (JP); SONY CORPORATION OF AMERICA, New York, NY (US)

(72) Inventors: Alexandre Zaghetto, San Jose, CA (US); Danillo Bracco Graziosi, Flagstaff, AZ (US); Ali Tabatabai, Cupertino, CA (US)

(73) Assignees: SONY GROUP CORPORATION, Tokyo (JP); SONY CORPORATION OS AMERICA, New York, NY (US)

( * ) Notice: Subject to any disclaimer, the term of this patent is extended or adjusted under 35 U.S.C. 154(b) by 698 days.

(21) Appl. No.: 18/306,935

(22) Filed: Apr. 25, 2023

(65) Prior Publication Data

US 2024/0020880 A1 Jan. 18, 2024

Related U.S. Application Data

(60) Provisional application No. 63/368,266, filed on Jul. 13, 2022.

(51) Int. Cl.
*G06T 7/73* (2017.01)
*G06T 7/62* (2017.01)

(52) U.S. Cl.
CPC .................. *G06T 7/75* (2017.01); *G06T 7/62* (2017.01); *G06T 2207/10028* (2013.01); *G06T 2207/20081* (2013.01)

(58) Field of Classification Search
None
See application file for complete search history.

(56) References Cited

U.S. PATENT DOCUMENTS

2019/0311502 A1* 10/2019 Mammou ........... G06F 16/9027
2021/0049790 A1* 2/2021 Gao .......................... G06T 9/00

OTHER PUBLICATIONS

Y. He, X. Ren, D. Tang, Y. Zhang, X. Xue and Y. Fu, "Density-preserving Deep Point Cloud Compression," 2022 IEEE/CVF Conference on Computer Vision and Pattern Recognition (CVPR), New Orleans, LA, USA, 2022, pp. 2323-2332, doi: 10.1109/CVPR52688.2022.00237. (Year: 2022).*

(Continued)

*Primary Examiner* — SJ Park
*Assistant Examiner* — Caroline E. Depalma
(74) *Attorney, Agent, or Firm* — CHIP LAW GROUP

(57) ABSTRACT

An electronic device and method for estimation of density distortion metric for processing of point cloud geometry is provided. The electronic device acquires a reference point cloud, encodes the reference point cloud to generate encoded point cloud data, and decodes the encoded point cloud data to generate a test point cloud. The electronic device further generates a first local density map representing local density values at points of the reference point cloud. The electronic device determines locations in the test point cloud corresponding to locations of the points. The electronic device generates a second local density map representing local density values at the determined locations. The electronic device computes a value of density distortion metric based on the first local density map and the second local density map. The electronic device controls a display device to render a reconstruction quality of the test point cloud based on the computed value.

19 Claims, 11 Drawing Sheets

(56) References Cited

OTHER PUBLICATIONS

Zaghetto et al: "[AI-3DGC] [EE0.6/EE5.0-Related] Density Distortion Metric", 139. MPEG Meeting; Jul. 18, 2022-Jul. 22, 2022; Online; (Motion Picture Expert Group or ISO/IEC JTC1/SC29/WG11), No. m60331 Jul. 13, 2022 (Jul. 13, 2022), XP030303705.
Madhuri et al: "Image Quality Assessment" In: "Image and Video Compression—Fundamentals, Techniques, and Applications", Nov. 17, 2014 (Nov. 17, 2014), CRC Press, XP093093126, ISBN: 978-1-4822-2822-9 pp. 137-156, section 7.4.1.
He, et al., "Density-preserving Deep Point Cloud Compression", Conference on Computer Vision and Pattern Recognition 2022 (CVPR), Apr. 2022, pp. 2333-2342.
Lee, et al., "A Statistical Manifold Framework for Point Cloud Data", Proceedings of the 39th International Conference on Machine Learning, Baltimore, Maryland, USA, 2022, 25 pages.
Liu, et al., "Reduced Reference Perceptual Quality Model and Application to Rate Control for 3D Point Cloud Compression", IEEE, Nov. 25, 2020, 12 pages.

* cited by examiner

ESTIMATION OF DENSITY DISTORTION METRIC FOR PROCESSING OF POINT CLOUD GEOMETRY

CROSS-REFERENCE TO RELATED APPLICATIONS/INCORPORATION BY REFERENCE

This application claims priority to U.S. Provisional Patent Application Ser. No. 63/368,266 filed on Jul. 13, 2022, the entire content of which is hereby incorporated herein by reference.

FIELD

Various embodiments of the disclosure relate to three-dimensional (3D) point cloud encoding and reconstruction. More specifically, various embodiments of the disclosure relate to estimation of density distortion metric for processing of point cloud geometry.

BACKGROUND

Advancements in the field of point cloud compression (PCC) have led to the development of PCC approaches (such as geometry-based PCC, video-based PCC, or machine learning-based PCC) that enable efficient representation of data associated with 3-Dimensional (3D) points of a point cloud. Typically, a high-fidelity representation of a surface of a 3D object may be obtained using a 3D point cloud geometry that includes millions or billions of unstructured 3D points. Such a geometry typically includes a large amount of point data that needs to be compressed using a suitable PCC approach for storage, processing, or transmission of the point cloud geometry. However, reconstruction (via decoding) of the point cloud geometry at a PCC decoder may lead to appearance of surface irregularities (such as deformation, erosion, or dilation) or artifacts (such as holes) in a reconstructed point cloud geometry. The reconstruction quality may be degraded due to appearance of artifacts or surface irregularities in the reconstructed point cloud geometry. The appearance of the artifacts and the surface irregularities may be independent of a number of bits that may be required to encode each 3D point of a reference point cloud geometry. Conventional methods for accessing reconstruction quality of a reconstructed point cloud may be based on metrics whose values may not be affected by appearance of the artifacts and the irregularities in the reconstructed point cloud geometry.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for estimation of density distortion metric for processing of point cloud geometry, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
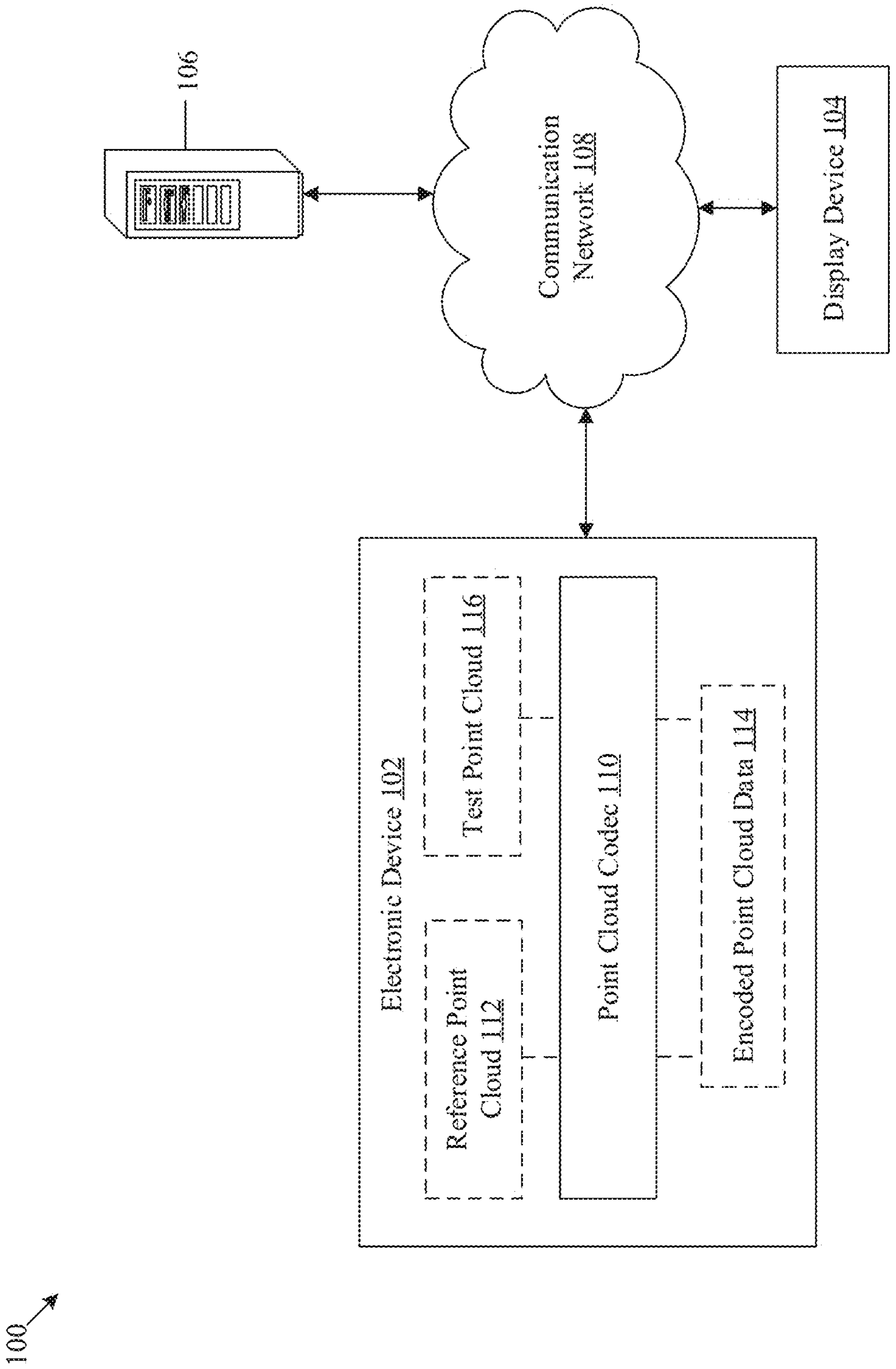
FIG. 1 is a diagram that illustrates an exemplary network environment for estimation of density distortion metric for processing of point cloud geometry, in accordance with an embodiment of the disclosure.

The following described implementations may be found in a disclosed electronic device method for estimation of density distortion metric for processing (for example, compression, sampling, smoothing, sharpening, denoising, outliers removal, restoration, and so on) of point cloud geometry. Exemplary aspects of the disclosure provide an electronic device (for example, a computing device, a mainframe machine, or a computer workstation) that may indicate a reconstruction quality of a point cloud based on values of a density distortion metric. The values of the density distortion metric may be indicative of appearance of geometry reconstruction artifacts (for example, surface deformation, surface erosion, or surface dilation) in reconstructed point clouds. The electronic device may acquire a reference point cloud of an object and may encode the reference point cloud (by use of a point cloud codec in the electronic device) to generate encoded point cloud data. The electronic device may decode the encoded point cloud data (by use of the point cloud codec) to generate a test point cloud. Thereafter, the electronic device may generate a first local density map of the reference point cloud. The first local density map may represent a local density value around each three-dimensional (3D) point of the reference point cloud. The electronic device may determine 3D locations on the test point cloud that correspond to locations of 3D points of the reference point cloud and may further generate a second local density map of the test point cloud. The second local density map may represent local density values corresponding to the determined 3D locations. Thereafter, the electronic device may compute a value of a density distortion metric for the test point cloud based on the first local density map and the second local density map. The electronic device may control a display device (for example, a computer monitor, a tablet, or a smartphone) to render information associated with a reconstruction quality of the test point cloud based on the computed value of the density distortion metric.

Different techniques for compression of original point clouds are available. For example, the techniques may include geometry-based point cloud compression (PCC), video-based PCC (V-PCC), and machine learning-based multiscale point cloud geometry compression (PCGC). A point cloud may be compressed to generate encoded point cloud data, which may be decoded to reconstruct the point cloud. The quality of the reconstructed point cloud may be evaluated using quality assessment methods (such as full-reference or reduced-reference methods) that utilize a reference point cloud (i.e., the original point cloud). The full-reference quality assessment may use a point-to-point metric or a point-to-plane metric to evaluate the quality of the reconstructed point cloud.

Based on values of the point-to-point metric or the point-to-plane metric, it may be observed that the reconstruction quality of a reconstructed point cloud monotonically increases with respect to an increase in number of bits used to encode the original point cloud. However, values of the point-to-point metric or the point-to-plane metric may not account for density-based distortions that may be introduced in the reconstructed point cloud due to incorrect voxel occupancy estimation. The density-based distortions may correspond to geometry reconstruction artifacts (such as holes) or irregularities in the surface of the reconstructed point cloud (such as surface deformation, surface erosion, surface dilation). The geometry reconstruction artifacts or the surface irregularities may appear in the reconstructed point cloud during reconstruction of the original point cloud (from the encoded point cloud data). The appearance of the density-based distortions may lead to degradation of the point cloud reconstruction quality since the contour of the surface of the original point cloud may not be preserved in the reconstructed point cloud (e.g., due to presence of the irregularities in the surface of the reconstructed point cloud). Further, the appearance of the density-based distortions may be independent of a number of bits used for encoding of 3D points of the original point cloud. Therefore, appearance of the geometry reconstruction artifacts or the surface irregularities in the reconstructed point cloud must be accounted in estimation of values of a reconstruction quality assessment metric to obtain a reliable measurement of the point cloud reconstruction quality.

To address the issues, the electronic device may compute a density distortion metric that may be used to determine whether density of the original point cloud is preserved in the reconstructed point cloud. To determine the density distortion metric, the original point cloud and the reconstructed point cloud may be transformed from a geometry domain to a density domain. The transformation may involve a determination of local density maps associated with the original point cloud and the reconstructed point cloud. Based on the local density maps, a density variation between the original point cloud and the reconstructed point cloud may be determined. The value of the density distortion metric may be inversely proportional to a degree of the density variation that may be determined between the original point cloud and the reconstructed point cloud. A higher degree of density variation may indicate appearance of surface irregularities or geometry reconstruction artifacts in the reconstructed point cloud. Thus, values of the density distortion metric may indicate whether one or more density-based distortions (i.e., surface irregularities or geometry reconstruction artifacts) have been introduced in the reconstructed point cloud during the reconstruction of the original point cloud. The density distortion metric may be further used for determination of whether one or more machine learning models of a machine learning based PCGC encoder needs to be re-trained. For instance, a reduction in value of the density distortion metric at a particular encoding bitrate (compared to values of the density distortion metric at lower encoding bitrates) may indicate that the machine learning model of the PCGC encoder requires retraining. Based on the indication, weights of one or more layers of the machine learning model (used to encode the original point cloud at the particular encoding bitrate) may be adjusted for efficient encoding of the original point cloud at the particular encoding bitrate.

The original point cloud may be referred to as a reference point cloud and the reconstructed point cloud may be referred to as a test point cloud. At each 3D point of the reference point cloud, a local density value may be determined based on a number of 3D points in the reference point cloud. The local density map associated with the reference point cloud may represent a local density of points around each 3D point of the reference point cloud. At each location on the test point cloud (i.e., that corresponds to a location of a 3D point of the reference point cloud), a local density value may be determined based on a number of 3D points in the test point cloud. The local density map associated with the test point cloud may represent a local density around each location. The density distortion metric may be determined based on a difference between the local density maps associated with the reference point cloud and the test point cloud.

FIG. 1 is a diagram that illustrates an exemplary network environment for estimation of density distortion metric for processing of point cloud geometry, in accordance with an embodiment of the disclosure. With reference to FIG. 1, there is shown a network environment 100. The network environment 100 includes an electronic device 102, a display device 104, and a server 106. The electronic device 102 may communicate with the display device 104 and the server 106, through one or more networks (such as a communication network 108). The electronic device 102 may include a point cloud codec 110. There is further shown a reference point cloud 112, encoded point cloud data 114, and a test point cloud 116. The point cloud codec 110 may receive the reference point cloud 112 as an input and may generate an output based on the reference point cloud 112. The output may include the encoded point cloud data 114.

Further, the point cloud codec 110 may generate the test point cloud 116 based on a decoding of the encoded point cloud data 114.

The electronic device 102 may include suitable logic, circuitry, interfaces, and/or code that may be configured to compute a value of a density distortion metric for the test point cloud 116. The value of the density distortion metric may be used to determine whether density distortions have been introduced in the test point cloud 116 during reconstruction of the reference point cloud 112 or generation of the test point cloud 116. The electronic device 102 may further control the display device 104 for rendering of the reconstruction quality of the test point cloud 116 (i.e., the computed value). Examples of the electronic device 102 may include, but are not limited to, a computing device, a mainframe machine, a video-conferencing system, an augmented reality (AR) device, a virtual reality (VR device), a mixed reality (MR) device, a game console, a mainframe machine, a server, a computer workstation, and/or a consumer electronic (CE) device.

The display device 104 may include suitable logic, circuitry, interfaces, and/or code that may be configured to communicate with the electronic device 102, via the communication network 108. The display device 104 may be configured to receive control instructions from the electronic device 102 via a suitable network interface. In accordance with an embodiment, the display device 104 may receive control instructions to render on an electronic user interface, information associated with a reconstruction quality of the test point cloud 116. The display device 104 may be further configured to receive user inputs associated with a selection of rate distortion points or a number of bits that the point cloud codec 110 may use to encode the reference point cloud 112. The display device 104 may be receive user inputs to initiate a training of machine learning-based models for the point cloud codec 110. Examples of the display device 104 may include, but are not limited to, a display system, a computing device, a gaming device, a mobile phone, a television, or an electronic device that can store or render multimedia content.

The server 106 may include suitable logic, circuitry, interfaces, and/or code that may be configured to generate reference point clouds (for example, the reference point cloud 112) of 3D object(s) in 3D space. The server 106 may process images and depth information of the object(s) to generate the reference point clouds. The server 106 may store the reference point clouds and information associated with the reference point clouds for future requirements. The server 106 may receive a request from the electronic device 102 and may transmit the reference point cloud 112 to the electronic device 102 based on the received request. The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to implementation of the server 106 and the electronic device 102 as two separate entities. In some embodiments, the functionalities of the server 106 can be incorporated in its entirety or at least partially in the electronic device 102, without a departure from the scope of the disclosure.

The communication network 108 may include a communication medium through which the electronic device 102, the display device 104, and the server 106 may communicate with each other. The communication network 108 may be a wired or wireless communication network. Examples of the communication network 108 may include, but are not limited to, Internet, a Wireless Fidelity (Wi-Fi) network, a Personal Area Network (PAN), a Local Area Network (LAN), or a Metropolitan Area Network (MAN). The electronic device 102 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The point cloud codec 110 may include suitable logic, circuitry, code, and/or interface that may be configured to encode the reference point cloud 112 of an object and decode the encoded point cloud data 114. For example, the point cloud codec 110 may be configured to partition the reference point cloud 112 into a plurality of 3D blocks and encode each 3D block of the reference point cloud 112 to generate the encoded point cloud data 114. Each encoder may encode a block of the reference point cloud 112 at a specific bitrate. In some embodiments, the reference point cloud 112 may be encoded in its entirety at a specific bitrate. After encoding, the point cloud codec 110 may be configured to reconstruct the reference point cloud 112 from the encoded point cloud data 114. The reconstruction may lead to the generation of the test point cloud 116.

In accordance with an embodiment, the point cloud codec 110 may include a set of machine learning-based encoders and a set of machine learning-based decoders. By way of example, and not limitation, the point cloud codec 110 may be implemented as a Deep Neural Network (in the form of trained model data with computer-executable instructions) that can be executed on a Graphical Processing Unit (GPU), a Central Processing Unit (CPU), a Tensor Processing Unit (TPU), a Reduced Instruction Set Computing (RISC), Application-Specific Integrated Circuit (ASIC), or a Complex Instruction Set Computing (CISC) processor, a co-processor, and/or a combination thereof. In another embodiment, the point cloud codec 110 may be implemented as a Deep Neural Network on a specialized hardware interfaced with other computational circuitry of the electronic device 102. Examples of the specialized hardware may include, but are not limited to, a field programmable gate array (FPGA), programmable logic devices (PLDs), application specific integrated parts (ASSPs), an ASIC, a programmable ASIC (PL-ASIC), and a System-on-Chip (SOC) based on standard microprocessors (MPUs) or digital signal processors (DSPs). In accordance with an embodiment, the point cloud codec 110 may be also interfaced with a GPU to parallelize operations of the point cloud codec 110.

The reference point cloud 112 may correspond to a geometrical representation of an object in 3D space and may include a set of 3D points. Each 3D point of the reference point cloud 112 may be a voxel. In accordance with an embodiment, the electronic device 102 may acquire the reference point cloud 112 from the server 106. In accordance with another embodiment, the electronic device 102 may generate the reference point cloud 112 based on a 3D scan (high-resolution) of the object. The 3D points of the reference point cloud 112 may include geometrical information (i.e., positions or coordinates of 3D points in the reference point cloud 112) and attribute information associated with the 3D points. The attribute information may include color information, reflectance information, opacity information, normal vector information, material identifier information, texture information, and the like.

The encoded point cloud data 114 may be generated based on encoding of the reference point cloud 112. The encoded point cloud data 114 may include encoded geometrical information (i.e., an encoding of 3D point cloud geometry) associated with 3D points of the reference point cloud 112. In certain embodiments, the encoded point cloud data 114 may include encoded attribute information associated with the 3D points of the reference point cloud 112.

The test point cloud 116 may be a reconstructed point cloud that corresponds to the reference point cloud 112. The test point cloud 116 may include geometrical information (for example, coordinates of the 3D points of the test point cloud 116) and attribute information associated with the 3D points of the test point cloud 116. The electronic device 102 may reconstruct the test point cloud 116 based on the encoded point cloud data 114. After reconstruction, density distortions may appear in the test point cloud 116. Such distortions may be indicative of a variation between a number of 3D points in the reference point cloud 112 and number of 3D points in the test point cloud 116. The density distortions may include geometry reconstruction artifacts (for example, holes) in one or more regions of the test point cloud 116, or irregularities (for example, erosion, deformation, or dilation) in the surface of one or more regions of the test point cloud 116.

In operation, the electronic device 102 may be configured to acquire the reference point cloud 112 of an object. In accordance with an embodiment, the reference point cloud may be an uncompressed point cloud of the object. The reference point cloud 112 may represent the geometry of the object using a plurality of 3D points. In some embodiments, the electronic device 102 may generate the reference point cloud 112 based on a plurality of images of the object (captured from different viewpoints) and depth information associated with the object. The plurality of images and the depth information may be obtained via one or more image capture devices and depth sensors associated with the electronic device 102.

The electronic device 102 may be further configured to encode the reference point cloud 112 to generate the encoded point cloud data 114. The reference point cloud 112 (3D points of the reference point cloud 112) may be encoded at a certain bitrate. The electronic device 102 may locally decode the encoded point cloud data 114 to generate the test point cloud 116. The electronic device 102 may be configured to determine the reconstruction quality of the test point cloud 116 (that is reconstructed by the point cloud codec 110). The reconstruction quality of the test point cloud 116 may depend on a number of bits that may be used to encode the 3D points of the reference point cloud 112 and density distortions that may appear during the reconstruction of the reference point cloud 112 (or generation of the test point cloud 116 based on the encoded point cloud data 114). The reconstruction quality of the test point cloud 116 may improve based on an increase in the encoding bitrate and training of at least one machine learning model of the point cloud codec 110. The training may prevent appearance of the density distortions in a test point cloud 116 that may be generated based on point cloud data. The point cloud data may be encoded by the at least one machine learning model of the point cloud codec 110.

The electronic device 102 may be further configured to generate a first local density map of the reference point cloud 112. The first local density map may represent an estimate of a local density value at each 3D point of the reference point cloud 112. The local density value at a 3D point may be estimated based on a volume of a region of the reference point cloud 112 that forms the neighborhood of the 3D point and a number of 3D points in the neighborhood of the 3D point. In accordance with an embodiment, the electronic device 102 may determine a count (or number) of 3D points in the reference point cloud 112 and dimensions of a structure (for example, a cubical region) that may include (or enclose) all 3D points of the reference point cloud 112. The electronic device 102 may further determine a radius ($R_{ref}$) based on the number of 3D points of the reference point cloud 112 and the dimensions of the structure.

The electronic device 102 may also determine a volume ($V_{ref}$) of a sphere using the determined radius (i.e., $R_{ref}$). Once the volume ($V_{ref}$) of the sphere is determined, the electronic device 102 may determine for each 3D point of the reference point cloud 112, a number of 3D points in the neighborhood of the corresponding 3D point. The neighborhood of a 3D point of the reference point cloud 112 may include 3D points included in the sphere of radius $R_{ref}$. The center (i.e., origin) of the sphere may be the location of the 3D point in the reference point cloud 112. The number of 3D points in the neighborhood of each 3D point of the reference point cloud 112 may be determined based on the reference point cloud 112, $R_{ref}$, and the location of the corresponding 3D point of the reference point cloud 112. The electronic device 102 may further estimate the local density of each 3D point of the reference point cloud 112 based on the number of 3D points in the neighborhood of the corresponding 3D point and the volume $V_{ref}$. The first local density map may be estimated based on the local density value at each of the 3D points of the reference point cloud 112.

The electronic device 102 may be further configured to determine 3D locations in the test point cloud 116 that correspond to locations of the 3D points of the reference point cloud 112. For example, if the reference point cloud 112 includes 3D points of a human face, 3D locations determined around nose region of the test point cloud 116 may correspond to 3D points in the nose region of the reference point cloud 112.

The electronic device 102 may be further configured to generate a second local density map of the test point cloud 116. The second local density map may represent an estimate of a local density value at each 3D location of the determined 3D locations in the test point cloud 116. In accordance with an embodiment, the electronic device 102 may determine a number of 3D points in a neighborhood of each 3D location of the determined 3D locations in the test point cloud 116. The neighborhood of a 3D location of the test point cloud 116 may include one or more points of the test point cloud 116 that may be included in the sphere of radius $R_{ref}$. The center (i.e., origin) of the sphere may be the 3D location of the test point cloud 116. The number of 3D points in the neighborhood of the 3D location of the test point cloud 116 may be determined based on the test point cloud 116, $R_{ref}$, and coordinates of the 3D location of the test point cloud 116. The coordinates may be same as coordinates of a 3D location of a 3D point of the reference point cloud 112 that corresponds to the 3D location of the test point cloud 116.

The electronic device 102 may further estimate the local density at each 3D location of the determined 3D locations in the test point cloud 116 based on the number of 3D points in the neighborhood of the corresponding 3D location of the test point cloud 116 and $V_{ref}$. The electronic device 102 may estimate the second local density map based on the estimated local density value at each 3D location of the test point cloud 116 that corresponds to a 3D location of a 3D point of the reference point cloud 112.

The electronic device 102 may be further configured to compute a value of a density distortion metric for the test point cloud 116 based on the first local density map and the second local density map. The electronic device 102 may generate a difference density map based on a comparison between the first local density map and the second local density map. The difference density map may be generated based on differences between local density values at the 3D points of the reference point cloud 112 and the 3D locations of the test point cloud 116 (i.e., locations which correspond to the locations of the 3D points of the reference point cloud 112). In accordance with an embodiment, the electronic device 102 may compute a mean square error based on the local density values represented by the first local density map and the second local density map. For a 3D point of the reference point cloud 112, a difference between a local density value at the 3D point and a local density value at a 3D location in the test point cloud 116 (that corresponds to a location of the 3D point) may be determined. Similarly, for other 3D points of the reference point cloud 112, such differences may be determined. The mean square error may be computed based on a sum of squares of the differences and a number of 3D points in the reference point cloud 112. The value of the density distortion metric may be computed further based on the computed mean square error.

In accordance with an embodiment, the electronic device 102 may determine a presence of geometry reconstruction artifacts (such as holes (loss of 3D points of the reference point cloud 112 in the test point cloud 116)) or irregularities on the surface of the test point cloud 116 (such as deformation, erosion, or dilation on the surface of the test point cloud 116 compared to that of the reference point cloud 112) based on the value of the density distortion metric. The value of the density distortion metric may be directly proportional to a presence of artifacts or surface irregularities in the test point cloud 116.

Based on the computed value of the density distortion metric, the electronic device 102 may be further configured to control the display device 104 to render information associated with a reconstruction quality of the test point cloud 116. For example, the electronic device 102 may control a user interface on the display device 104 to render the information. In accordance with an embodiment, the user interface may render the computed value of the density distortion metric as information associated with the reconstruction quality the test point cloud 116. The information may also include data indicative of variation of values of the density distortion metric for different test point clouds (which may have been reconstructed from encoded point cloud data of the reference point cloud 112) or for different rate distortion points. In accordance with an embodiment, the data may be rendered in a tabular format or a graphical format.

In some embodiments, the information may be rendered using indicators that indicate regions of the test point cloud 116 cloud with geometry reconstruction artifacts and the surface irregularities. The electronic device 102 may control the user interface to indicate one or more regions of the test point cloud 116 where geometry reconstruction artifacts (i.e., holes) or surface irregularities (i.e., deformation, erosion, or dilation) may be present.

Figure 5:
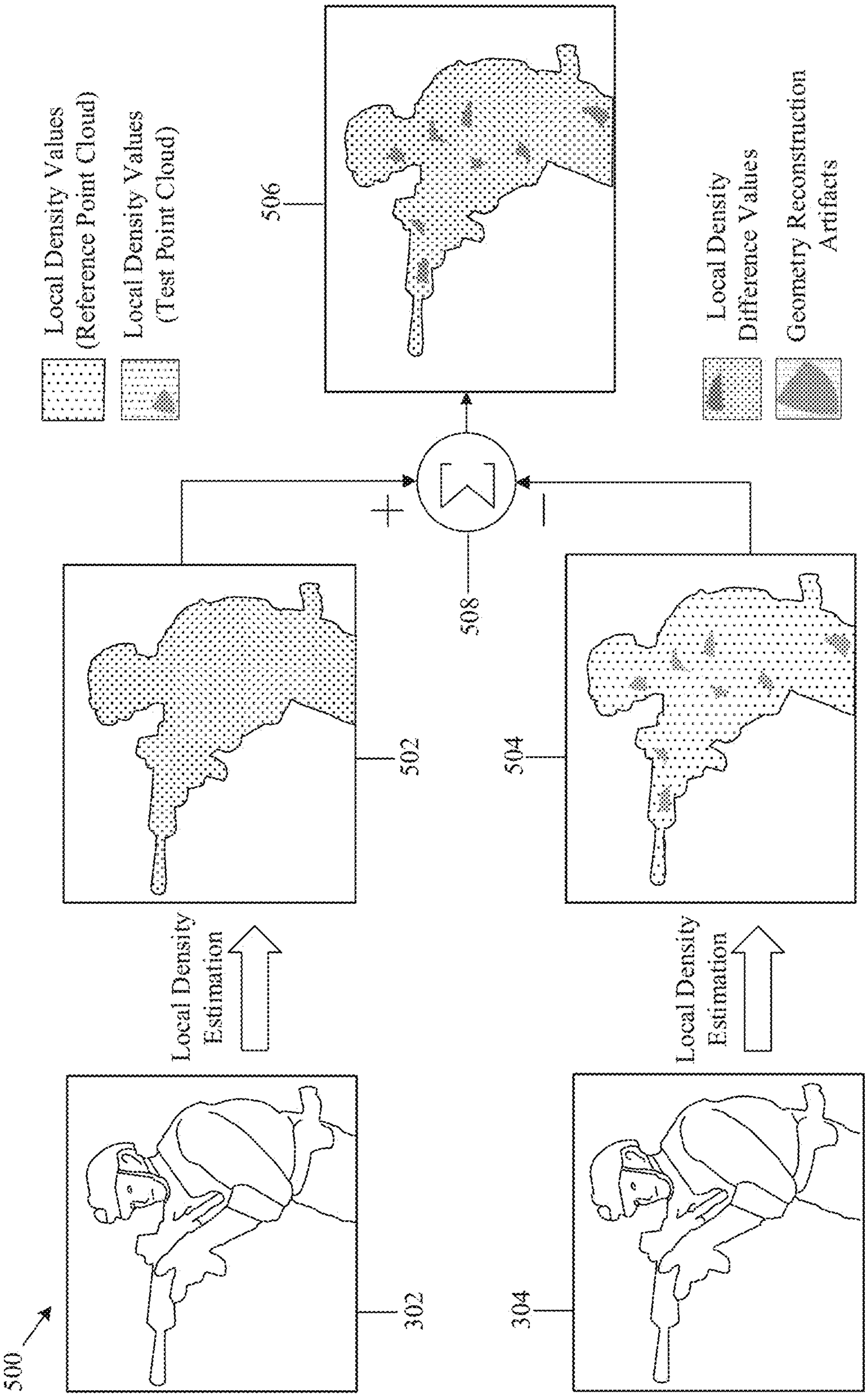
FIG. 5 is a diagram that illustrates an exemplary scenario for generation of a difference density map based on local density maps associated with a reference point cloud and a test point cloud, in accordance with an embodiment of the disclosure.

In some embodiments, the presence of holes may be indicated in certain regions of the second density map or the difference density map. The local density in those regions (i.e., regions which represent holes) may be lower than that in other regions of the second density map. A portion of the determined 3D locations in the test point cloud 116 may fall within such regions of the second density map. The local density for the portion of the 3D locations in the test point cloud 116 may be less than a density threshold (as shown in FIG. 5 using dark spots on soldier's body). On the other hand, local density difference values in certain regions (i.e., regions which represent holes) may be higher than that in other regions of the difference density map.

Figure 2:
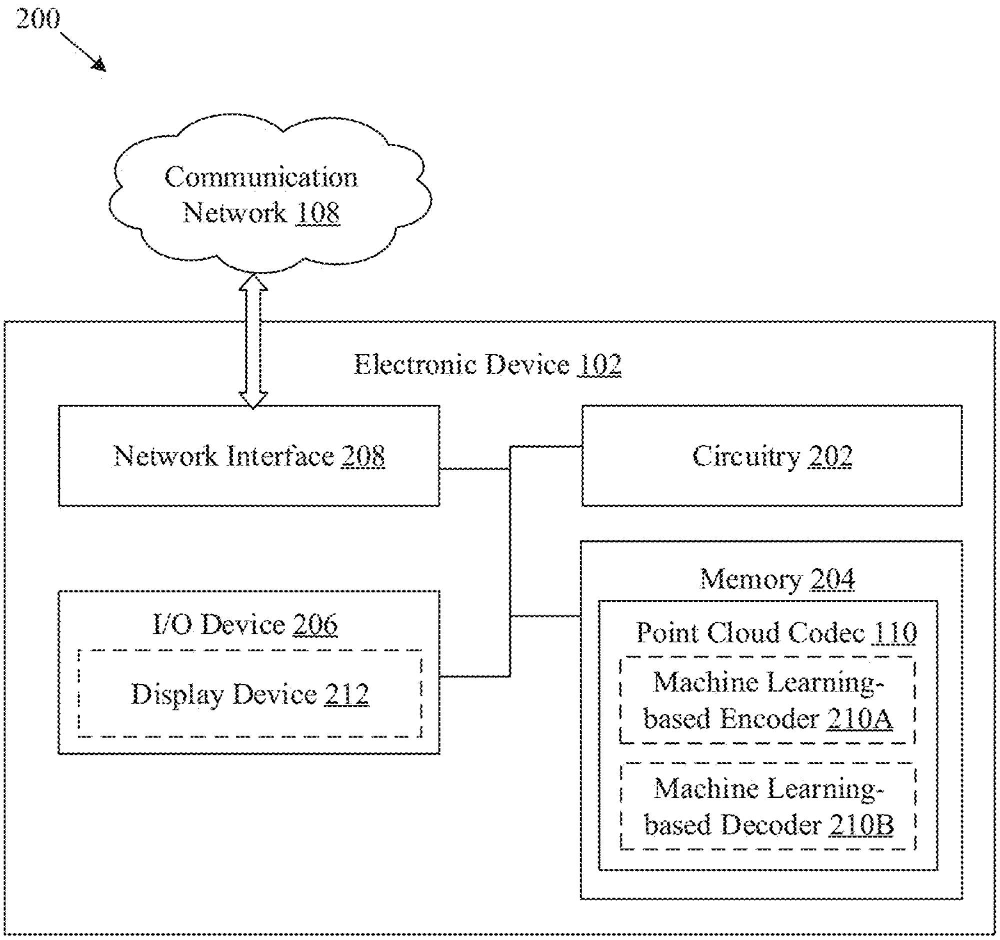
FIG. 2 is a block diagram that illustrates an exemplary electronic device for estimation of density distortion metric for processing of point cloud geometry, in accordance with an embodiment of the disclosure.

FIG. 2 is a block diagram that illustrates an exemplary electronic device for estimation of density distortion metric for processing of point cloud geometry, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. In at least one embodiment, the memory 204 may store the point cloud codec 110. The point cloud codec 110 may include a machine learning-based encoder 210A and a machine learning-based decoder 210B. In at least one embodiment, the I/O device 206 may also include a display device 212. The circuitry 202 may be communicatively coupled to the memory 204, the I/O device 206, and the network interface 208 through a wired or wireless communication of the electronic device 102.

The circuitry 202 may include suitable logic, circuitry, and interfaces that may be configured to execute program instructions associated with a set of operations to be executed by the electronic device 102. instructions associated with different operations to be executed by the electronic device 102A. The set of operations may include, but may not be limited to, acquisition of the reference point cloud 112, encoding of the reference point cloud 112 for generation of the encoded point cloud data 114, decoding of the encoded point cloud data 114 for generation of the test point cloud 116, generation of the first local density map (of the reference point cloud 112) that represents the local density value at each 3D point of the reference point cloud 112, determination of 3D locations in the test point cloud 116 that correspond to the locations of the 3D points of the reference point cloud 112, generation of a second local density map of the test point cloud 116 that represents a local density value at each 3D location of the determined 3D locations in the test point cloud 116, computation of the value of the density distortion metric based on a difference between the first local density map and the second local density map, and control of the display device 104 to render information associated with the reconstruction quality of the test point cloud 116 based on the computed value. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store instructions executable by the circuitry 202. The memory 204 may be configured to store operating systems and associated applications. The memory 204 may be further configured to store the acquired reference point cloud 112 of the object, the encoded point cloud data 114 and the test point cloud 116. The memory 204 may be further configured to store the first local density map, the second local density map, the difference density map, the values of the density distortion metric, and the information associated with the reconstruction quality of the test point cloud 116. The point cloud codec 110 included in the memory 204 may be implemented as a combination of programmable instructions stored in the memory 204 and logical units (or programmable logic units) on a hardware circuitry of the electronic device 102. Example implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

Each of the machine learning-based encoder 210A and the machine learning-based decoder 210B (included in the point cloud codec 110) may be a computational network or a system of artificial neurons, arranged in a plurality of layers, as nodes. The plurality of layers may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers. Outputs of each hidden layer may be coupled to inputs of at least one node in other layers. Node(s) in the final layer may receive inputs from at least one hidden layer to output a result. The number of layers and the number of nodes in each layer may be determined from hyper-parameters of each of the machine learning-based encoder 210A and the machine learning-based decoder 210B. Such hyper-parameters may be set before, while training, or after training each of the machine learning-based encoder 210A and the machine learning-based decoder 210B on a training dataset.

Each node may correspond to a mathematical function (e.g., a sigmoid function or a rectified linear unit) with a set of parameters that may be tunable during training. The set of parameters may include, for example, a weight parameter, a regularization parameter, and the like. Each node may use the mathematical function to compute an output based on one or more inputs from nodes in other layer(s) (e.g., previous layer(s)) of the corresponding machine learning model. All or some of the nodes may correspond to same or a different same mathematical function. In training of each the machine learning-based encoder 210A or the machine learning-based decoder 210B, one or more parameters of each node may be updated based on whether an output of the final layer for a given input (from the training dataset) matches a correct result based on a loss function of the machine learning-based encoder 210A or the machine learning-based decoder 210B. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

Each of the machine learning-based encoder 210A and the machine learning-based decoder 210B may include electronic data, which may be implemented as, for example, a software component of an application executable on an electronic device (for example, the electronic device 102). Each of the machine learning-based encoder 210A and the machine learning-based decoder 210B may rely on libraries, external scripts, or other logic/instructions for execution by a processing device, such as the circuitry 202. Each of the machine learning-based encoder 210A and the machine learning-based decoder 210B may include code and routines configured to enable a computing device, such as the circuitry 202 to perform one or more operations to encode or decode a 3D block associated with the reference point cloud 112. Additionally, or alternatively, each of the machine learning-based encoder 210A and the machine learning-based decoder 210B may be implemented using hardware including a processor, a microprocessor (e.g., to perform or control performance of one or more operations), a FPGA, or an ASIC. Alternatively, in some embodiments, the neural network model may be implemented using a combination of hardware and software.

The machine learning-based encoder 210A may receive the reference point cloud 112 for compression. In accordance with an embodiment, the received reference point cloud 112 may be partitioned into a set of 3D blocks. The machine learning-based encoder 210A may include an encoder circuitry and/or software to encode each 3D block of the set of 3D blocks for determination of a set of encoded blocks, based on application of the machine learning-based encoder 210A on each 3D block. The set of encoded blocks may correspond to the encoded point cloud data 114. The encoding of the set of 3D blocks may convert the reference point cloud 112 into a bitstream (i.e., an encoded bitstream) of compressed point cloud data (i.e., the encoded point cloud data 114).

The machine learning-based decoder 210B may receive the encoded bitstream (i.e., the encoded point cloud data 114). Similarly, the machine learning-based decoder 210B may include a decoder circuitry and/or software to decode each encoded block of the set of the encoded blocks for determination of a set of decoded blocks based on application of the machine learning-based decoder 210B on each encoded block. The machine learning-based decoder 210B may binarize and merge the set of decoded blocks to obtain a reconstructed point cloud (i.e., the test point cloud 116). The machine learning-based decoder 210B may information associated with partitioning of the reference point cloud 112 in a signaling bitstream (received along with the encoded point cloud data 114 to binarize and merge the set of decoded blocks.

The I/O device 206 may include suitable logic, circuitry, interfaces, and/or code that may be configured to receive a user input. For example, the user input may include a number of bits to be used for encoding of each 3D point of the reference point cloud 112. The I/O device 206 may be further configured to provide an output based on the user input. For example, the output may include a computed value of the density distortion metric. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display device 212. In some embodiments, the display device 212 may correspond to the display device 104. The functionalities of the display device 212 (i.e., the display device 104) may be incorporated in its entirety or at least partially in the electronic device 102.

The display device 212 may include suitable logic, circuitry, interfaces, and/or code that may be configured to render the reference point cloud 112 and the test point cloud 116 onto a display screen of the display device 212. The display device 212 may be further configured to, based on reception of control signals from the circuitry 202, render information associated with a reconstruction quality of the test point cloud 116 based on a computed value of a density distortion metric. The display device 212 may further render the first local density map, the second local density map, and the difference density map. In accordance with an embodiment, the display device 212 may include a touch screen to receive the user input. The display device 212 may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 212 may refer to a display screen of smart-glass device, a 3D display, a see-through display, a projection-based display, an electro-chromic display, and/or a transparent display.

The network interface 208 may include suitable logic, circuitry, interfaces, and/or code that may be configured to establish a communication between the electronic device 102, the display device 104, and the server 106, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions or operations executed by the electronic device 102, as described in FIG. 1, may be performed by the circuitry 202. Operations executed by the circuitry 202 are described in detail, for example, in FIGS. 3, 4, 5, 6, 7A, and 7B.

Figure 3:
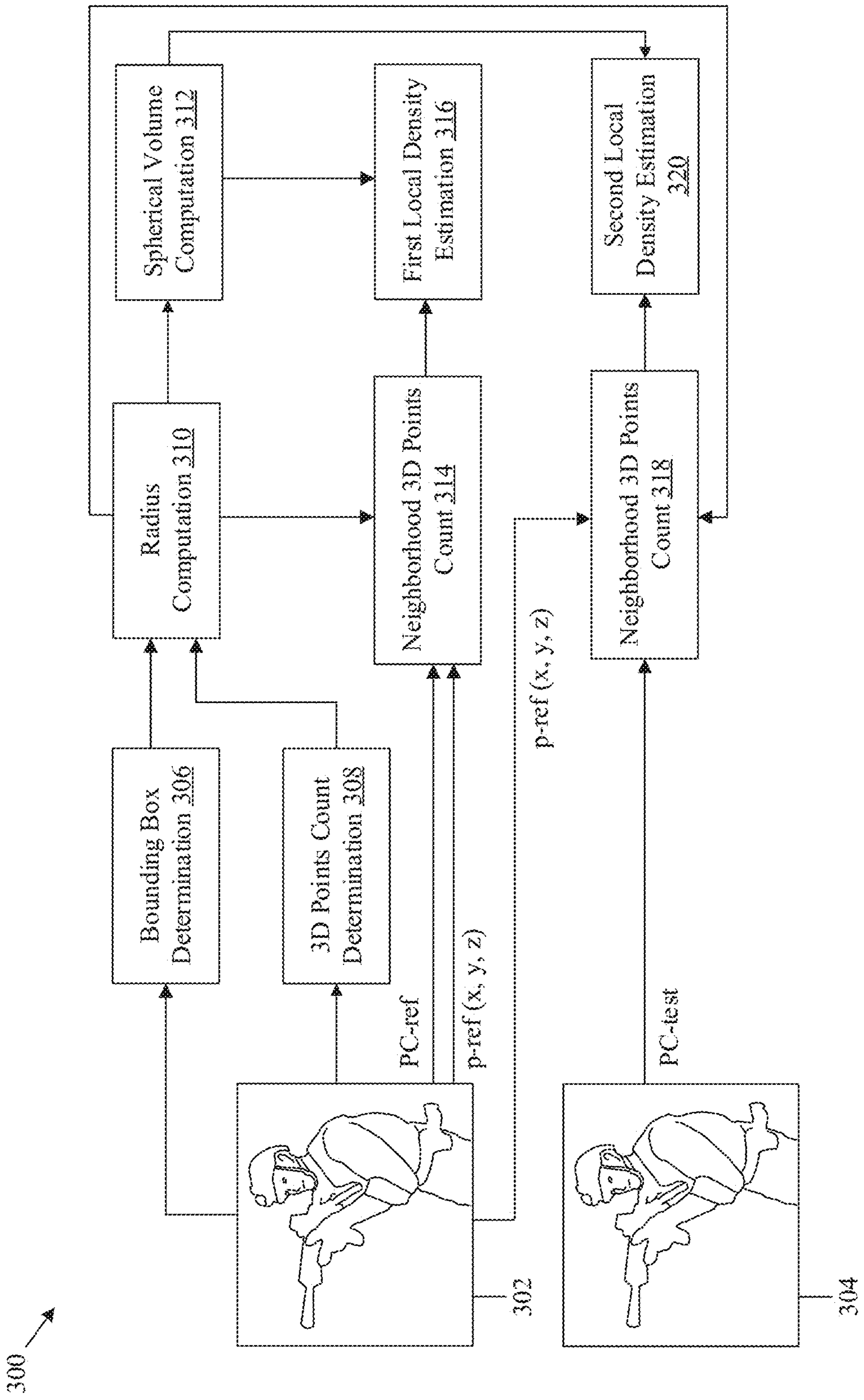
FIG. 3 is a diagram that illustrates an exemplary processing pipeline for estimation of local density at 3D points of a reference point cloud and associated 3D locations in a test point cloud, in accordance with an embodiment of the disclosure.

FIG. 3 is a diagram that illustrates an exemplary processing pipeline for estimation of local density at 3D points of a reference point cloud and associated 3D locations in a test point cloud, in accordance with an embodiment of the disclosure. FIG. 3 is explained in conjunction with elements from FIG. 1 and FIG. 2. With reference to FIG. 3, there is shown an exemplary processing pipeline 300 for estimation of local density at each 3D point for a reference point cloud 302 and 3D locations in a test point cloud 304. In the processing pipeline 300, there is shown a sequence of operations that may start from 306 and end at 320. The sequence of operations may be executed by the circuitry 202 of the electronic device 102. The reference point cloud 302 may be an exemplary point cloud that may be same as or similar to the reference point cloud 112 of FIG. 1. Similarly, the test point cloud 304 may be an exemplary point cloud that may be same as or similar to the test point cloud 116 of FIG. 1. The reference point cloud 302 may be an uncompressed point cloud of an object. The circuitry 202 may generate the test point cloud 304 based on encoded point cloud data (that may be obtained after encoding the reference point cloud 302).

At 306, a bounding box for the reference point cloud 302 ($PC_{ref}$) may be determined. In at least one embodiment, the circuitry 202 may be configured to determine the bounding box for the reference point cloud 302. The bounding box may include all 3D points of the reference point cloud 302. By way of example, and not limitation, the first bounding box may correspond to a cubical region. The circuitry 202 may be configured to determine the dimensions (i.e., length, breadth, and height) of the cubical region. For example, length "a", breadth "b", and height "c" may be the dimensions of the bounding box. The dimensions of the cubical region may be such that the cubical region includes all 3D points of the reference point cloud 302.

At 308, a number of 3D points of the reference point cloud 302 ($PC_{ref}$) may be determined. In at least one embodiment, the circuitry 202 may be configured to determine the number of 3D points in the reference point cloud 302.

At 310, a radius may be computed. In at least one embodiment, the circuitry 202 may be configured to compute the radius to be used to sample 3D points of the reference point cloud 302. The radius may be computed based on the bounding box and the number of 3D points in the reference point cloud 302. The bounding box may include a plurality of surfaces of equal dimensions that may be determined based on the dimensions of the bounding box. Each surface "$S_R$" may be determined as a square of the cube root of the volume of the bounding box. For example, the volume of the bounding box may be determined as "a×b×c" (since the length, breadth, and height (i.e., the dimensions) of the bounding box are "a", "b", and "c" respectively). Thus, "$S_R$" may be determined using equation (1), as follows:

$$S_R = \sqrt[3]{a \times b \times c}^{\,2} \quad (1)$$

Once the plurality of surfaces is determined, the circuitry 202 may compute the radius based on the number of 3D points in the reference point cloud 302 and the number of 3D points within each surface of the reference point cloud 302. The radius may be determined as a square root of a product of a number of 3D points ("$N_R$") on each surface of the reference point cloud 302 and a fraction of the surface ("$S_R$"), and the number of 3D points in the reference point cloud 302 ("$N_{points\text{-}reference}$"). The radius may be formulated using equation (2), as follows:

$$R_1 = \sqrt[3]{N_R \times S_R / N_{points\text{-}reference}} \quad (2)$$

At 312, a spherical volume may be computed. In at least one embodiment, the circuitry 202 may be configured to compute the spherical volume based on the radius.

At 314, a first number of 3D points in a neighborhood of each 3D point of the reference point cloud 302 may be determined. In at least one embodiment, the circuitry 202 may be configured to determine, from the 3D points of the reference point cloud 302, the first number of 3D points in the neighborhood of each 3D point of the reference point cloud 302. The neighborhood of each 3D point of the reference point cloud 302 may include a plurality of points that may be included in a sphere of the computed radius and the computed volume. The first number of 3D points in the neighborhood of each 3D point of the reference point cloud 302 may be determined based on a location (i.e., coordinates x, y, and z) of the corresponding 3D point ($p_{ref}$) of the reference point cloud 302, the reference point cloud 302, and the computed radius (computed at 310). The center (or origin) of the sphere may be the location of the corresponding 3D point (i.e., $p_{ref}$ (x, y, z)) of the reference point cloud 302.

At 316, a first local density value at each 3D point of the reference point cloud 302 may be estimated. In at least one embodiment, the circuitry 202 may be configured to estimate the first local density value at each 3D point of the reference point cloud 302 based on the spherical volume and the first number of 3D points in the neighborhood of the corresponding 3D point (for example, $p_{ref}$). Specifically, the first local density value at the 3D point ($p_{ref}$) may be estimated as a ratio of the first number of 3D points in the neighborhood of the 3D point ($p_{ref}$) and the spherical volume. The circuitry 202 may be further configured to generate a first local density map of the reference point cloud 302 based on the first local density value at each 3D point of the reference point cloud 302.

At 318, a second number of 3D points in a neighborhood of each 3D location of a set of 3D locations in the test point cloud 304 may be determined. In at least one embodiment, the circuitry 202 may be configured to determine, from the 3D points of the test point cloud 304, the second number of 3D points in the neighborhood of each 3D location of the set of 3D locations in the test point cloud 304. The circuitry 202 may determine each 3D location of the set of 3D locations that may correspond to a 3D location of a 3D point of the reference point cloud 302. The neighborhood of each 3D location in the test point cloud 304 may include a plurality of 3D points of the test point cloud 304. The plurality of 3D points of the test point cloud 304 may be located in a sphere of the computed radius (computed at 310) and the computed spherical volume (computed at 312). The second number of 3D points in the neighborhood of a 3D location (of the set of 3D locations) in the test point cloud 304 may be determined based on coordinates (i.e., $p_{ref}$ (x, y, z)) of a corresponding 3D location of a 3D point ($p_{ref}$) of the reference point cloud 302, the test point cloud 304, and the computed radius. The center (or origin) of the sphere may be coordinates of the 3D location in the test point cloud 304. The coordinates of the 3D location in the test point cloud 304 may be same as that of the corresponding 3D location (i.e., $p_{ref}$ (x, y, z)) of the 3D point ($p_{ref}$) of the reference point cloud 302.

At 320, a second local density value at each 3D location in the test point cloud 304 may be estimated. In at least one embodiment, the circuitry 202 may be configured to estimate the second local density value at each 3D location of the set of 3D locations in the test point cloud 304. The estimation may be based on the spherical volume and the second number of 3D points in the neighborhood of the corresponding 3D location of the set of 3D locations in the test point cloud 304. The second local density value at a 3D location in the test point cloud 304 may be estimated as a ratio of the second number of 3D points in the neighborhood of the 3D location and the spherical volume. The circuitry 202 may be further configured to generate a second local density map of the test point cloud 304 based on second local density values at each 3D location of the set of 3D locations in the test point cloud 304.

Figure 4:
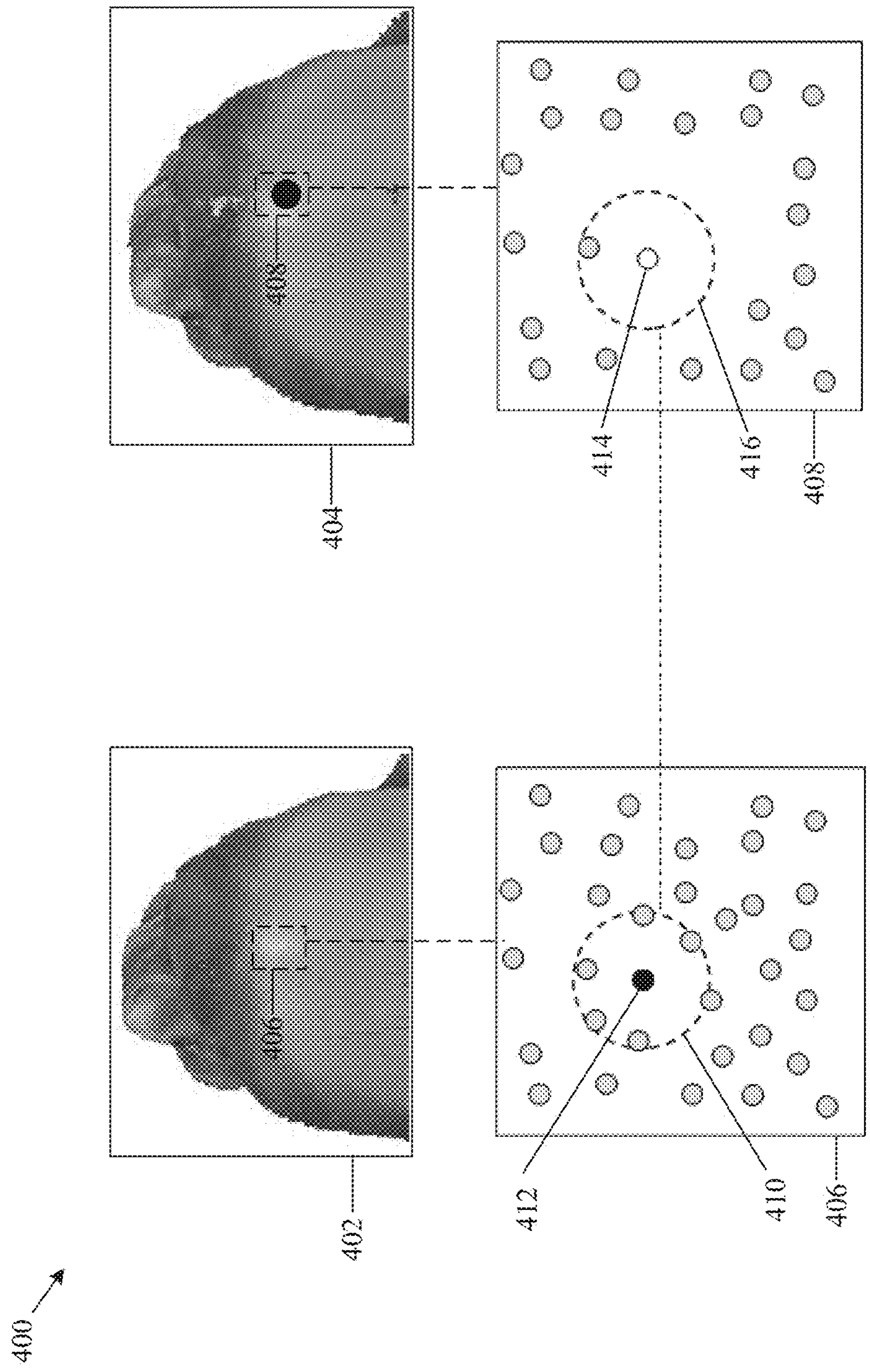
FIG. 4 is a diagram that illustrates a comparison of a region of a reference point cloud with a corresponding region of a test point cloud, in accordance with an embodiment of the disclosure.

FIG. 4 is a diagram that illustrates a comparison of a region of a reference point cloud with a corresponding region of a test point cloud, in accordance with an embodiment of the disclosure. FIG. 4 is explained in conjunction with elements from FIG. 1, FIG. 2, and FIG. 3. With reference to FIG. 4, there is shown an exemplary scenario 400. In exemplary scenario 400, there is shown a reference point cloud 402 and a test point cloud 404. There is further shown 3D points in a region 406 of the reference point cloud 402 and 3D points in a region 408 of the test point cloud 404. The reference point cloud 402 may be an exemplary point cloud that may be same as or similar to the reference point cloud 112 of FIG. 1. Similarly, the test point cloud 404 may be an exemplary point cloud that may be same as or similar to the test point cloud 116 of FIG. 1. The reference point cloud 402 may be an uncompressed point cloud of an object such as a human head. The circuitry 202 may reconstruct the test point cloud 404 based on encoded point cloud data that may be obtained after encoding of the reference point cloud 402.

In accordance with an embodiment, the circuitry 202 may be configured to compute a radius of a sphere 410 based on a first number of 3D points in the reference point cloud 302 and a bounding box that encloses all 3D points of the reference point cloud 402. The circuitry 202 may be also configured to compute a volume of the sphere 410 based on the radius of the sphere 410. For example, the center of the sphere 410 may correspond to the 3D location of the 3D point 412. The neighborhood of the 3D point 412 may correspond to a region enclosed by the sphere 410. The circuitry 202 may be configured to determine a first number of 3D points in neighborhood of the 3D point 412 based on the location (i.e., coordinates) of the 3D point 412, the reference point cloud 402, and the radius of the sphere 410. For example, the number of 3D points in the neighborhood of the 3D point 412 may be determined as 5.

The circuitry 202 may be further configured to estimate a local density value at the 3D point 412 based on the volume of the sphere 410 and the first number of 3D points in the neighborhood of the 3D point 412. Similarly, local density values at other 3D points in the region 406 and 3D points in other regions of the reference point cloud 402 may be estimated based on the volume of the sphere 410 and first number of 3D points in the neighborhoods of the other 3D points. The circuitry 202 may be further configured to generate a first local density map of the reference point cloud 402. Each location on the first local density map may be representative of an estimated local density value at a 3D point of the reference point cloud 402.

In accordance with an embodiment, the circuitry 202 may be configured to determine 3D locations in the region 408 that correspond to 3D locations of the 3D points in the region 406. For example, the circuitry 202 may determine a 3D location 414 in the region 408. Similarly, other 3D locations in the region 408 corresponding to 3D locations of the 3D points in the region 406 may be determined. The determined 3D location 414 may correspond to the location of the 3D point 412. The coordinates of the 3D location 414 may be identical to that of the 3D point 412 (if the origins of the reference point cloud 402 and the test point cloud 404 are same). The coordinates of the 3D location 414 may correspond to the center of a sphere 416 whose volume may be identical to that of the sphere 410. The circuitry 202 may determine a second number of 3D points in a neighborhood of the 3D location 414 in the test point cloud 404. The neighborhood of the 3D location 414 may correspond to a region enclosed by the sphere 416. The second number of 3D points in neighborhood of the 3D location 414 may be determined based on the coordinates of the 3D location 414 (i.e., the coordinates of the 3D point 412), the test point cloud 404, and a radius of the sphere 416 (i.e., the radius of the sphere 410). For example, the second number of 3D points in the neighborhood of the 3D location 414 may be determined as 1.

At the 3D location 414 in the test point cloud 404, the circuitry 202 may be configured to estimate a local density value. The circuitry 202 may estimate the local density value at the 3D location 414 based on the volume of the sphere 416 and a second number of 3D points in neighborhood of the 3D location 414 in the test point cloud 404. Similarly, local density values at each of the determined 3D locations in the region 408 and other determined 3D locations in the test point cloud 404 may be estimated. The estimations may be based on the volume of the sphere 416 and a second number of 3D points in the neighborhoods of the other determined 3D locations in the test point cloud 404. The circuitry 202 may be further configured to generate a second local density map of the test point cloud 404. Each location on the second local density map may be representative of an estimated local density value at a determined 3D location in the test point cloud 404.

The local density values at the 3D points in the region 406 may be higher than the local density values at the determined 3D locations in the region 408. This may be because of a reduction in number of 3D points in a neighborhood of each 3D point in the region 406 as compared to that in a neighborhood of each determined 3D location in the region 408. The circuitry 202 may compare local density values at the 3D points in the region 406 and the determined 3D locations in the region 408. Based on the comparison, the circuitry 202 may determine appearance of geometry reconstruction artifacts in the test point cloud 404 during the generation of the test point cloud 404 (or reconstruction of the reference point cloud 402).

FIG. 5 is a diagram that illustrates an exemplary scenario for generation of a difference density map based on local density maps associated with a reference point cloud and a test point cloud, in accordance with an embodiment of the disclosure. FIG. 5 is explained in conjunction with elements from FIG. 1, FIG. 2, FIG. 3, and FIG. 4. With reference to FIG. 5, there is shown a first local density map 502, a second local density map 504, and a difference density map 506 that may be generated based on the first local density map 502 and the second local density map 504. The first local density map 502 may be representative of local density values at the 3D points of the reference point cloud 302 of FIG. 3. The second local density map 504 may be representative of local density values at the 3D locations in the test point cloud 304 that correspond to the 3D locations of the 3D points of the reference point cloud 302 of FIG. 3.

In accordance with an embodiment, the circuitry 202 may be configured to quantize each of the first local density map 502 and the second local density map 504. Each of the local density values (at the 3D points of the reference point cloud 302) represented by the first local density map 502 may be quantized to a defined number of quantization levels. Similarly, the local density values (at determined 3D locations corresponding to 3D locations of the 3D points) that is represented by the second local density map 504 may be quantized to the defined number of quantization levels. For example, the defined number of quantization levels may be "$2^{16}-1$" and quantization step size "$\Delta_x$" may be represented by "$\max_x - \min_x$". Thus, if the local density value at a 3D point of the reference point cloud 302 or a 3D location (corresponding to a 3D location of the 3D point) in the test point cloud 304 is "x", then the quantized value "$x_q$" may be represented using equation (3) as follows:

$$x_q = \text{round}\left((x - \min_x)\frac{2^{16} - 1}{\max_x - \min_x}\right) \tag{3}$$

The circuitry 202 may be configured to generate the difference density map 506 based on differences (obtained by use of an accumulator 508) between the quantized local density values represented by the first local density map 502 and the quantized local density values that may be represented by the second local density map 504. Each of the locations of the difference density map 506 may be representative of a local density difference value associated with a 3D point of the reference point cloud 302. For a 3D point, an associated local difference density value may be determined based on a difference between a quantized local density value at the 3D point and a quantized local density value at a determined 3D location of the test point cloud 304. The quantized local density value at the 3D point may be obtained from the first local density map 502 and the quantized local density value at a determined 3D location may be obtained from the second local density map 504.

Figure 6:
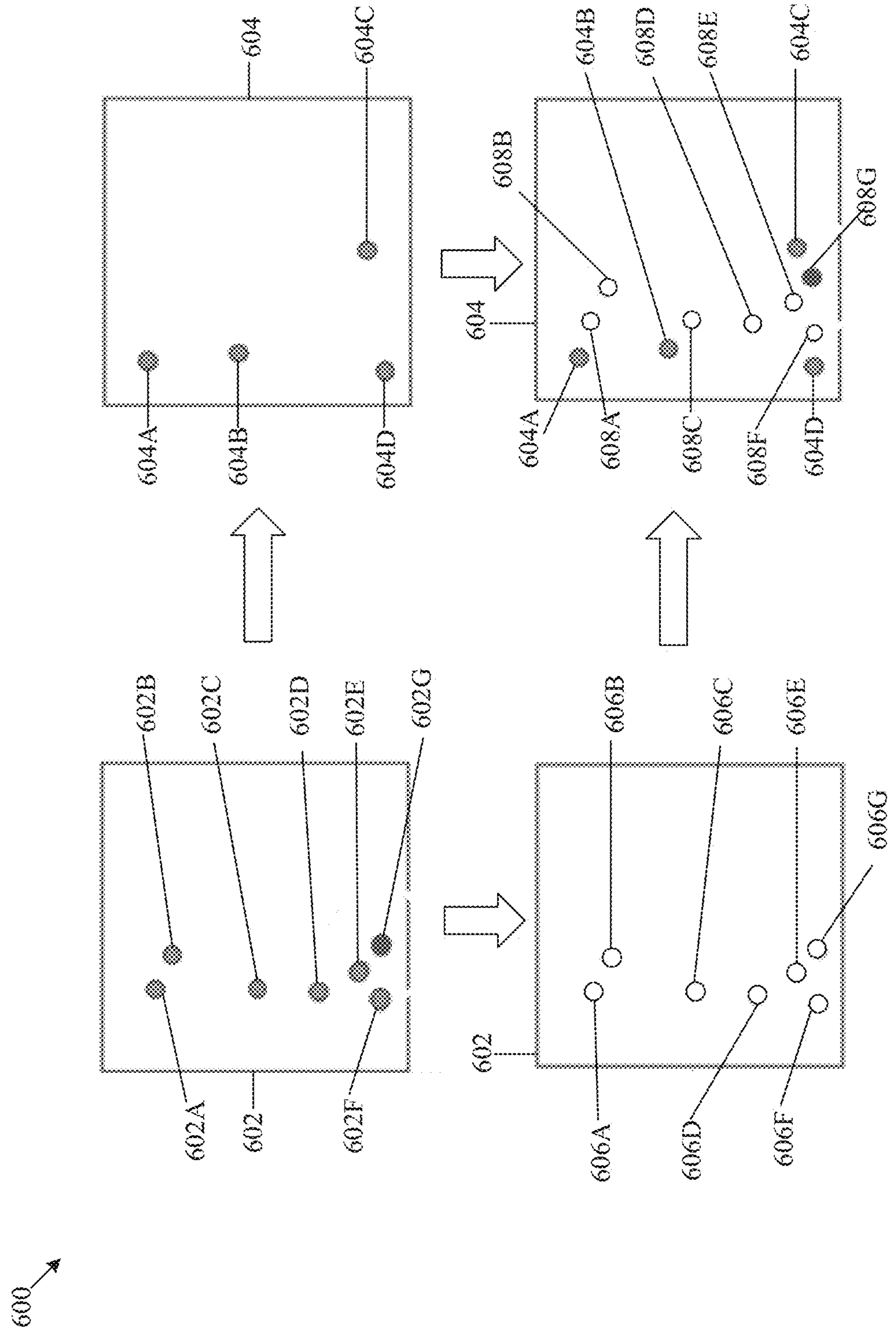
FIG. 6 is a diagram that illustrates an exemplary scenario for computation of a density distortion metric based on local density maps of a reference point cloud and a test point cloud, in accordance with an embodiment of the disclosure.

FIG. 6 is a diagram that illustrates an exemplary scenario for computation of a density distortion metric based on local density maps of a reference point cloud and a test point cloud, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary scenario 600. In exemplary scenario 600, there is shown 3D points of a reference point cloud 602 and a test point cloud 604. The circuitry 202 may select the reference point cloud 602 as reference data and the test point cloud 604 as test data. There is further shown 3D locations of the 3D points of the reference point cloud 602 and 3D locations in the test point cloud 604 that may correspond to the 3D locations of the 3D points of the reference point cloud 602. The reference point cloud 602 may be an uncompressed point cloud. The test point cloud 604 may be reconstructed based on encoded point cloud data that may be obtained after encoding the reference point cloud 602.

The reference point cloud 602 may include 3D points 602A-602G and the test point cloud 604 may include 3D points 604A-604D. During the generation of the test point cloud 604, one or more 3D points of the 3D points 602A-602G may be lost or displaced. Once the reference point cloud 602 and the test point cloud 604 are generated, the circuitry 202 may be configured to generate a first local density map for the reference point cloud 602 and a second local density map for the test point cloud 604.

The first local density map of the reference point cloud 602 may be representative of local density values at each of the 3D points 602A-602G. To determine the local density values, the circuitry 202 may further determine coordinates (for example, "x", "y", and "z" coordinate values) of 3D locations 606A-606G where the 3D points 602A-602G of the reference point cloud 602 may be present. For example, the 3D point 602A may be present at the location 606A. Similarly, the 3D point 602G may be present at the location 606G of the reference point cloud 602. Each 3D location of the 3D locations 606A-606G may be referred as "ref($x_i$,$y_i$, $z_i$)", where "i"∈"606A"-606G". Once the coordinates of the 3D locations 606A-606G are determined, local density values at the 3D locations 606A-606G may be determined. The first local density map of the reference point cloud 602 may be representative of a local density value determined at each 3D location of the 3D locations 606A-606G (where a 3D point of the 3D points 602A-602G is present). Thus, the first local density map of the reference point cloud 602 may be referred as $LDM_{ref}$={LD_ref($x_i$,$y_i$,$z_i$)|i∈606A-606G}, where "LD_ref($x_i$,$y_i$,$z_i$)" may represent local density value at a 3D location "i" of the reference point cloud 602.

The circuitry 202 may further be further configured to determine 3D locations in the test point cloud 604 that may correspond to the 3D locations 606A-606G of the 3D points 602A-602G. The determined 3D locations in the test point cloud 604 may be 3D locations 608A-608G. Each 3D location of the determined 3D locations 608A-608G in the test point cloud 604 may correspond to a 3D location of the 3D locations 606A-606G of the 3D points 602A-602G (provided origins of the reference point cloud 602 and the test point cloud 604 are identical). Therefore, the coordinates of the 3D locations 608A-608G may be identical to the determined coordinates of the 3D locations 606A-606G. For example, the coordinates of the 3D location 608A may be identical to the coordinates of the location 606A. Similarly, the coordinates of the 3D location 608G may be identical to the coordinates of the location 606G. Each 3D location of the 3D locations 608A-608G of the test point cloud 604 may be referred as "tes($x_i$,$y_i$,$z_i$)", where "i"∈"608A"-"608G".

Once the coordinates of the 3D locations 608A-608G are determined, local density values at the 3D locations 608A-608G may be determined. The second local density map of the test point cloud 604 may be representative of a local density value determined at each 3D location of the 3D locations 608A-608G (that corresponds to the 3D locations 606A-606G where the 3D points 602A-602G are present). Thus, the second local density map for the test point cloud 604 may be represented as $LDM_{tes}$={LD_tes($x_i$,$y_i$,$z_i$)|i∈608A-608G}. "LD_tes($x_i$,$y_i$,$z_i$)" may represent local density value at a 3D location "i" in the test point cloud 604.

The circuitry 202 may be further configured to compute a local density difference values associated with each of the 3D points 602A-602G of the reference point cloud 602. For example, a local density difference value associated with the 3D point 602A may be computed. The computation may be performed based on a difference between local density value at the 3D location 606A (i.e., "LD_ref($x_{606A}$,$y_{606A}$,$z_{606A}$)") and local density value at the 3D location 608A (i.e., "LD_tes($x_{608A}$,$y_{608A}$,$z_{608A}$)") Similarly, local density difference values associated with the other 3D points 602B-602G may be computed. The circuitry 202 may, thus, generate a first difference density map that may be representative of the local density difference values associated with the 3D points 602A-602G.

The circuitry 202 may obtain, from the difference density map, the local density difference value associated with each of the 3D points 602A-602G. For example, the local density difference value for the 3D point 602A (i.e., LD_ref($x_{606A}$, $y_{606A}$,$z_{606A}$)−LD_tes($x_{608A}$,$y_{608A}$,$z_{608A}$)) may be obtained. Similarly, local density difference values for other 3D points 602B-602G may be obtained. Thereafter, the circuitry 202 may compute a sum of squares of the local density difference values associated the 3D points 602A-602G.

In accordance with an embodiment, the circuitry 202 may be further configured to compute a first mean square error (MSE) based on the first local density map and the second local density map. The first MSE may be determined based on the sum of squares of the local density difference values. The first MSE may be represented using equation (4) as follows:

$$\text{First } MSE = \sum_{i=A}^{G} (\text{LD\_ref}(x_{606i}, y_{606i}, z_{606i}) - \text{LD\_tes}(x_{608i}, y_{608i}, z_{608i}))^2 \tag{4}$$

It may be observed that equation (4) may be generalized for a reference point cloud that may include "$N_A$" 3D points. The generalized first MSE may be represented using equation (5) as follows:

$$\text{First } MSE = \sum_{i=1}^{N_A} (\text{LD\_ref}(x_i, y_i, z_i) - \text{LD\_tes}(x_1, y_1, z_1))^2 \tag{5}$$

In accordance with an embodiment, the density distortion metric ("$D_3$") may be computed based on mean square error ("MSE") and a defined number of quantization levels (i.e., "$2^{16}-1$").

The density distortion metric is represented using equation (6) as follows:

$$D_3 = 20\log_{10}\left(\frac{2^{16}-1}{\sqrt{\frac{\text{First } MSE}{N_A}}}\right) \tag{6}$$

The computed value of the density distortion metric may be obtained for a selected rate distortion point or a number of bits used to encode each of the 3D points of the reference point cloud 602. Based on a variation in the rate distortion point or a number of bits, the value of the density distortion metric may vary.

In accordance with an embodiment, the density distortion metric may indicate a peak signal-to-noise ratio (PSNR) associated with a test point cloud (for example, the test point cloud 604). Equation (6) may be modified into equation (7), as follows:

$$PSNR = 20\log_{10}\left(\frac{2^{16}-1}{\sqrt{\frac{\text{First } MSE}{N_A}}}\right) \tag{7}$$

Figure 7B:
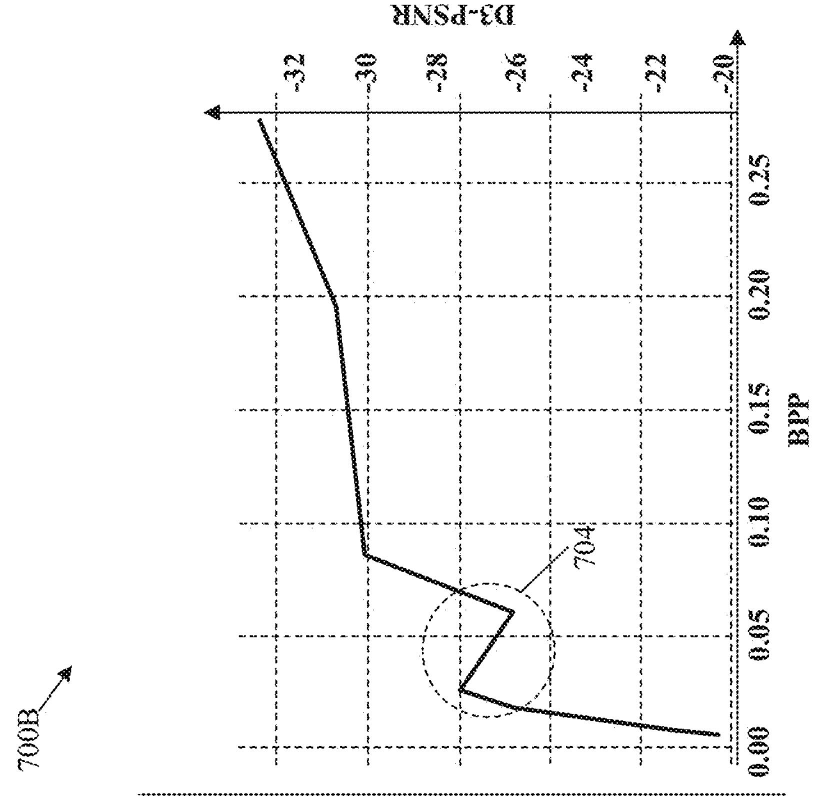
FIGS. 7A and 7B are exemplary graphs that illustrate variation of density distortion metric values with respect to number of bits used to encode 3D points of a reference point cloud, in accordance with an embodiment of the disclosure.
Figure 7A:
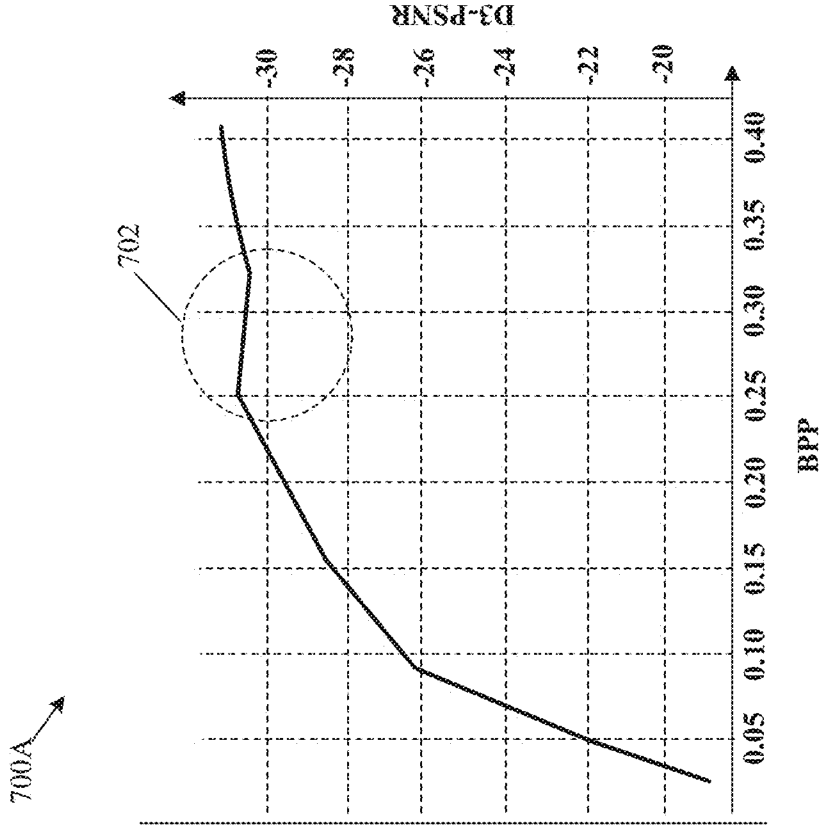

FIGS. 7A and 7B are exemplary graphs that illustrate variation of density distortion metric values with respect to number of bits used to encode 3D points of a reference point cloud, in accordance with an embodiment of the disclosure. FIGS. 7A and 7B are explained in conjunction with elements from FIG. 1, FIG. 2, FIG. 3, FIG. 4A, FIG. 4B, FIG. 5, and FIG. 6. With reference to FIGS. 7A and 7B, there are shown exemplary graphs 700A and 700B. In the exemplary graphs 700A and 700B, there is shown a variation in computed values of the density distortion metric (D3-PSNR) with respect to number of bits per point (BPP) used to encode 3D points of a reference point cloud.

The circuitry 202 may compute a value of the density distortion metric for each test point cloud that may be generated by a first machine learning-based encoder (FIG. 7A) or a second machine learning-based encoder (FIG. 7B) based on encoded point cloud data obtained by encoding each 3D point of the reference point cloud within a BPP range. The first machine learning-based encoder or the second machine learning-based encoder may generate test point clouds based on determination of spatial occupancies of voxels from encoded point cloud data of the reference point cloud.

The density distortion metric values may be indicative of reconstruction quality of the test point clouds. The reconstruction quality of a test point cloud may be a computed value of the density distortion metric value, which may be determined based on local density maps of the reference point cloud and the test point cloud. The reconstruction quality may monotonically increase with respect to increase in BPP used to encode each 3D point of the reference point cloud. However, in some scenarios, the reconstruction quality of a test point cloud generated based on point cloud data encoded at a certain BPP may be lower than the reconstruction quality of another test point cloud generated based on point cloud data encoded at a lower BPP.

For example, as shown in a region 702 of the exemplary graph 700A, reconstruction quality of a first test point cloud may be lower than that of a second test point cloud. The first test point cloud may be generated based on point cloud data encoded at 0.3 BPP. Whereas the second test point cloud may be generated based on point cloud data encoded at 0.25 BPP. Similarly, as shown in a region 704 of the exemplary graph 700B, a reconstruction quality of a third test point cloud may be lower than that of a fourth test point cloud. The third test point cloud may be generated based on point cloud data encoded at 0.061 BPP. Whereas the fourth point cloud may be generated based on point cloud data encoded at 0.026 BPP. The degradations in the reconstruction quality of test point clouds may occur due to presence of density distortions such as geometry reconstruction artifacts (for example, holes) or surface irregularities (for example, as deformation, erosion, or dilation) in the test point clouds. The presence of the density distortions may be attributed to occurrence of errors in estimations of localized occupancy (i.e., occupancy of 3D points in a voxel).

The degradations in reconstruction quality due to such errors may be observed using the density distortion metric values (and not using point-to-point or point-to-plane metrics). This is because the appearance of the geometry reconstruction artifacts or surface irregularities may lead to higher variations in density maps of the test point clouds as compared to variations in a density map of the reference point cloud. Such variations may lower the values of the density distortion metric value (as observed in regions 702 and 704) and the reconstruction quality of the test point clouds.

In accordance with an embodiment, the circuitry 202 may be configured to control the display device 104 (or the display device 212) to render information associated with the reconstruction quality of the test point clouds based on the computed values of the density distortion metric. The information may correspond to the exemplary graphs 700A and 700B. Based on the rendered information, the circuitry 202 may be configured to receive inputs that enable selection, from a plurality of rate distortion (RD) points, of an RD point as an optimal rate that may be used to encode the reference point cloud. The RD point may correspond to a BPP (for example, 0.25 BPP (as shown in FIG. 7A) or 0.026 BPP (as shown in FIG. 7B)) to be used to encode each 3D point of the reference point cloud. The selection may be performed based on a determination that the computed value of the density distortion metric is above a threshold value.

In accordance with an embodiment, the circuitry 202 may be configured to train the machine learning-based encoder 210A on a point cloud encoding task based on a first auxiliary loss that uses the computed value of the density distortion metric. For example, as shown in FIG. 7A, the values of the density distortion metrics may be used to train the machine learning-based encoder 210A on the point cloud encoding task based on the first auxiliary loss. The values may be computed for a test point cloud that may be generated based on the point cloud data encoded at 0.25 BPP.

In accordance with an embodiment, the circuitry 202 may be configured to train the machine learning-based decoder 210B on a point cloud reconstruction task based on a second auxiliary loss that uses the computed value of the density distortion metric. For example, as shown in FIG. 7B. the values of the density distortion metrics may be used to train the machine learning-based decoder 210B on the point cloud reconstruction task based on the second auxiliary loss. The values may be computed for a test point cloud that may be generated based on the point cloud data encoded at 0.061 BPP.

Figure 8:
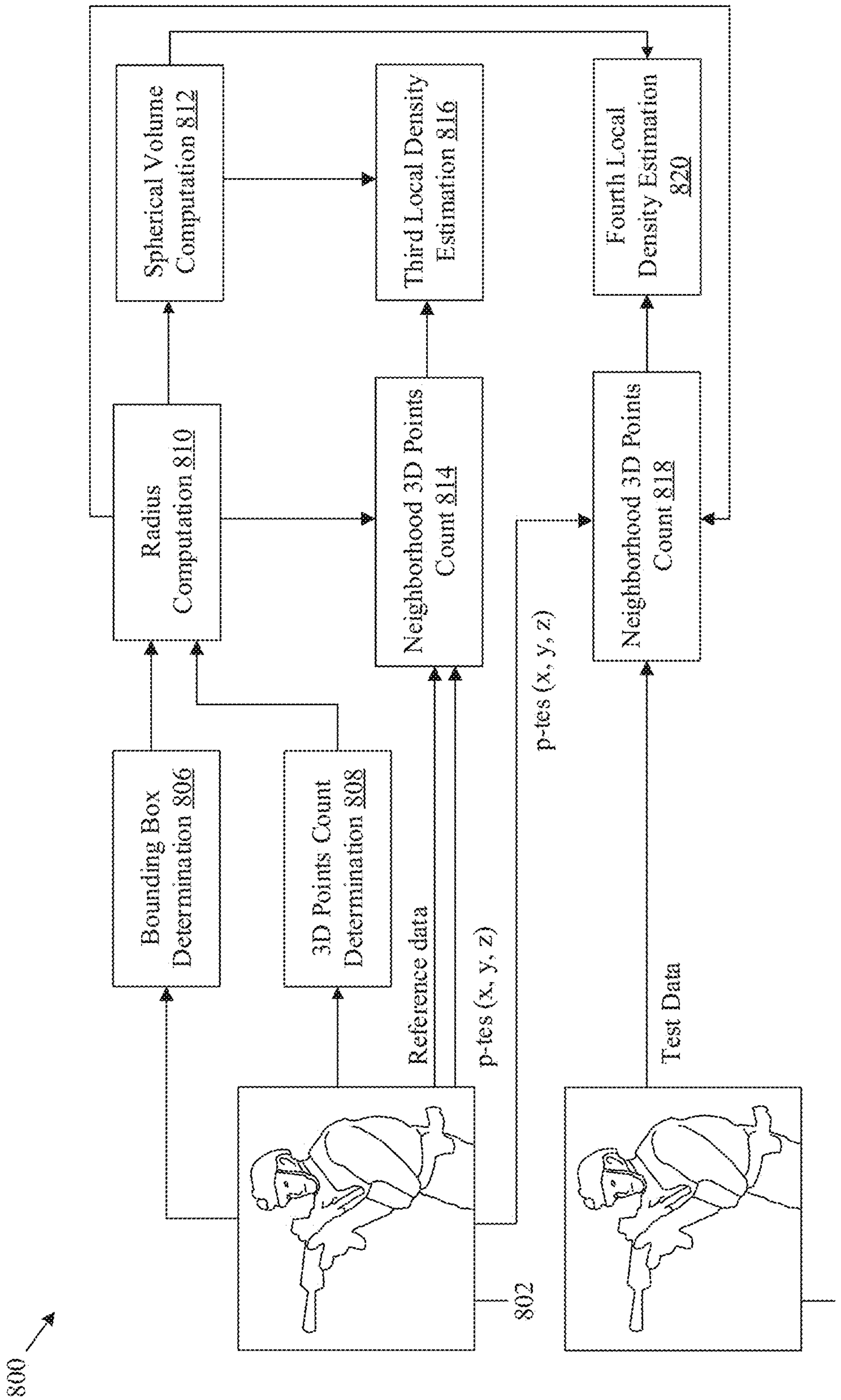
FIG. 8 is a diagram that illustrates an exemplary processing pipeline for estimation of local density at 3D points of reference data and associated 3D locations in test data, in accordance with an embodiment of the disclosure.

FIG. 8 is a diagram that illustrates an exemplary processing pipeline for estimation of local density at 3D points of reference data and associated 3D locations in test data, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary processing pipeline 800 for estimation of local density at each 3D point for reference data 802 and for test data 804. In the processing pipeline 800, there is shown a sequence of operations that may start from 806 and end at 820. The sequence of operations may be executed by the circuitry 202 of the electronic device 102. During operation, the circuitry 202 may select the test point cloud 304 as the reference data 802 and the reference point cloud 302 as the test data 804.

At 806, a bounding box for the reference data 802 may be determined. In at least one embodiment, the circuitry 202 may be configured to determine the bounding box for the reference data 802 (i.e., the test point cloud 304). The bounding box may include all 3D points of the test point cloud 304. The circuitry 202 may be configured to determine the dimensions (i.e., length, breadth, and height) of the bounding box. For example, length "p", breadth "q", and height "r", may be the dimensions of the bounding box. The dimensions of the cubical region may be such that the cubical region includes all 3D points of the test point cloud 304.

At 808, a number of 3D points in the reference data may be determined. In at least one embodiment, the circuitry 202 may be configured to determine the number of 3D points in the reference data 802 (i.e., the test point cloud 304).

At 810, a radius may be computed. In at least one embodiment, the circuitry 202 may be configured to compute the radius to be used to sample 3D points of the reference data 802 (i.e., the test point cloud 304). The radius may be computed based on the bounding box and the number of 3D points in the test point cloud 304. The bounding box (for the reference data 802) may include a plurality of surfaces of equal dimensions that may be determined based on the dimensions of the bounding box. Each surface "$S_T$" may be determined as a square of the cube root of the volume of the bounding box. For example, the volume of the bounding box may be determined as "p×q×r" (since the length, breadth, and height (i.e., the dimensions) of the bounding box are "p", "q", and "r" respectively). Thus, "$S_T$" may be determined using equation (8), as follows:

$$S_T = \sqrt[3]{p \times q \times r}^2 \tag{8}$$

Once the plurality of surfaces is determined, the circuitry 202 may compute the radius based on the number of 3D points in the reference data 802 (i.e., the test point cloud 304) and the number of 3D points within each surface of the test point cloud 304. The radius may be determined as a square root of a product of a number of 3D points ("$N_T$") on each surface of the test point cloud 304 and a fraction of the surface ("$S_T$"), and the number of 3D points in the test point cloud 304 ("$N_{points\text{-}test}$") The radius may be formulated using equation (9), as follows:

$$R_2 = \sqrt[2]{N_T \times S_T / N_{points\text{-}test}} \tag{9}$$

At 812, a spherical volume may be computed. In at least one embodiment, the circuitry 202 may be configured to compute the spherical volume based on the radius.

At 814, a third number of 3D points in a neighborhood of each 3D point of the reference data 802 may be determined. In at least one embodiment, the circuitry 202 may be configured to determine, from the 3D points of the reference data 802 (i.e., the test point cloud 304), the third number of 3D points in the neighborhood of each 3D point of the reference data 802 (i.e., the test point cloud 304). The neighborhood of each 3D point of the reference data 802 (i.e., the test point cloud 304) may include a plurality of points that may be included in a sphere of the computed radius and the computed volume. The third number of 3D points in the neighborhood of each 3D point of the reference data 802 (i.e., the test point cloud 304) may be determined based on a location (i.e., coordinates x, y, and z) of the corresponding 3D point ($p_{tes}$) of the reference data 802 (i.e., the test point cloud 304), the reference data 802 (i.e., the test point cloud 304), and the computed radius (computed at 810). The center (or origin) of the sphere may be the location of the corresponding 3D point (i.e., $p_{tes}$ (x, y, z)) of the reference data 802 (i.e., the test point cloud 304).

At 816, a third local density value at each 3D point of the reference data 802 may be estimated. In at least one embodiment, the circuitry 202 may be configured to estimate the third local density value at each 3D point of the reference data 802 (i.e., the test point cloud 304) based on the spherical volume and the third number of 3D points in the neighborhood of the corresponding 3D point (for example, $p_{tes}$). Specifically, the third local density value at the 3D point ($p_{tes}$) may be estimated as a ratio of the third number of 3D points in the neighborhood of the 3D point ($p_{tes}$) and the spherical volume. The circuitry 202 may be further configured to generate a third local density map of the reference data 802 (i.e., the test point cloud 304) based on the third local density value at each 3D point of the reference data 802 (i.e., the test point cloud 304).

At 818, a fourth number of 3D points in a neighborhood of each 3D location of a set of 3D locations in the test data 804 may be determined. In at least one embodiment, the circuitry 202 may be configured to determine, from the 3D points of the test data 804 (i.e., the reference point cloud 302), the fourth number of 3D points in the neighborhood of each 3D location of the set of 3D locations in the test data 804 (i.e., the reference point cloud 302). The circuitry 202 may determine each 3D location of the set of 3D locations that may correspond to a 3D location of a 3D point of the reference data (i.e., the test point cloud 304). The neighborhood of each 3D location in the test data 804 (i.e., the reference point cloud 302) may include a plurality of 3D points of the test data 804 (i.e., the reference point cloud 302). The plurality of 3D points of the test data 804 may be located in a sphere of the computed radius (computed at 810) and the computed spherical volume (computed at 812). The fourth number of 3D points in the neighborhood of a 3D location (of the set of 3D locations) in the test data 804 (i.e., the reference point cloud 302) may be determined based on coordinates (i.e., $p_{tes}$ (x, y, z)) of a corresponding 3D location of a 3D point ($p_{tes}$) of the reference data 802 (i.e. the test point cloud 304), the test data 804 (i.e., reference point cloud 302), and the computed radius. The center (or origin) of the sphere may be coordinates of the 3D location in the test data 804 (i.e., reference point cloud 302). The coordinates of the 3D location in the test data 804 (i.e., reference point cloud 302) may be same as that of the corresponding 3D location (i.e., $p_{tes}$ (x, y, z)) of the 3D point ($p_{ref}$) of the reference data 802 (i.e., the test point cloud 304).

At 820, a fourth local density value at each 3D location in the test data 804 may be estimated. In at least one embodiment, the circuitry 202 may be configured to estimate the fourth local density value at each 3D location of the set of 3D locations in the test data 804 (i.e., the reference point cloud 302). The estimation may be based on the spherical volume and the fourth number of 3D points in the neighborhood of the corresponding 3D location of the set of 3D locations in the test data 804 (i.e., the reference point cloud 302). The fourth local density value at a 3D location in the test data 804 (i.e., the reference point cloud 302) may be estimated as a ratio of the fourth number of 3D points in the neighborhood of the 3D location and the computed spherical volume. The circuitry 202 may be further configured to generate a fourth local density map of the test data 804 (i.e., the reference point cloud 302) based on fourth local density values at each 3D location of the set of 3D locations in the test data 804 (i.e., the reference point cloud 302).

Figure 9:
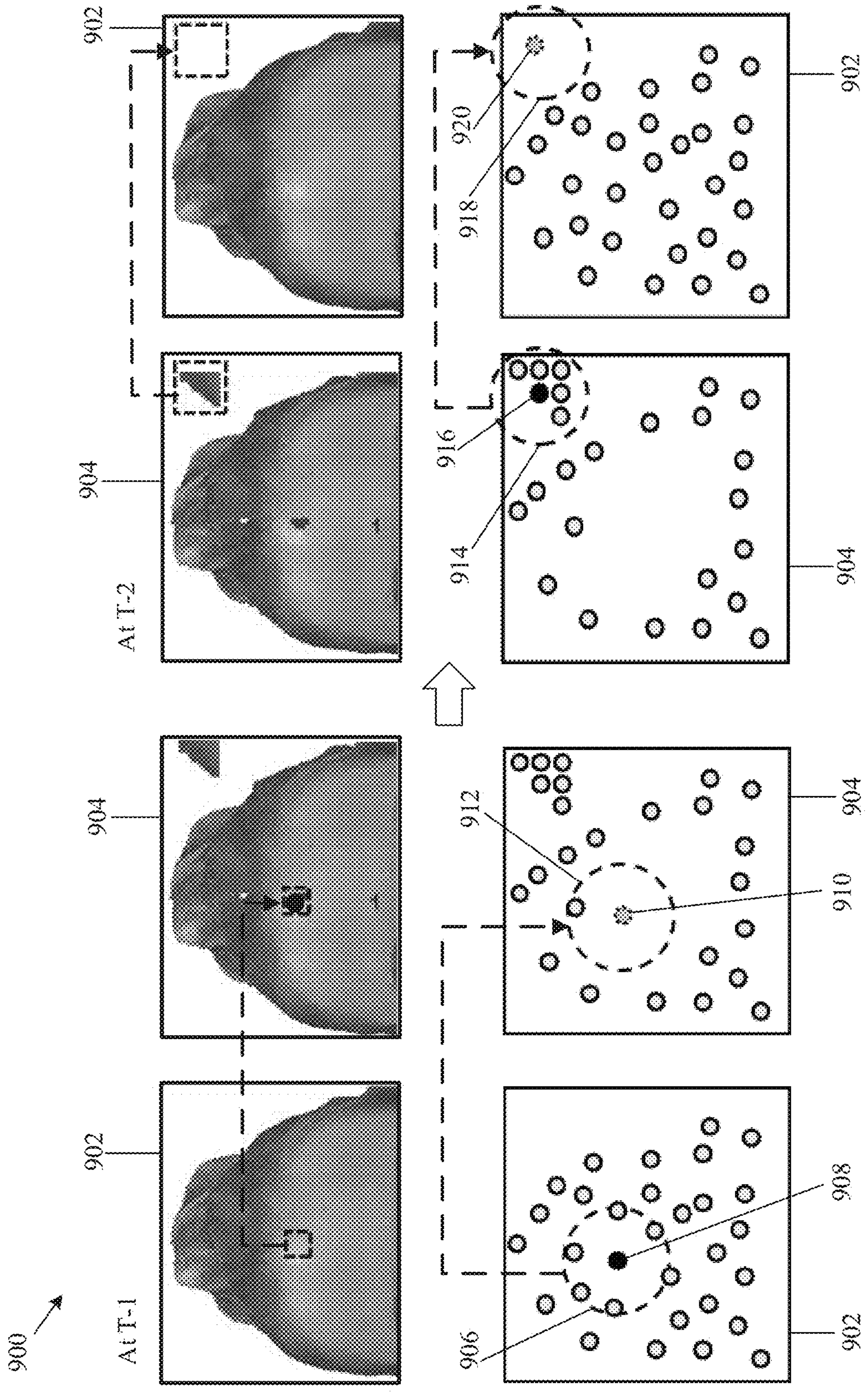
FIG. 9 is a diagram that illustrates selections of regions of a reference point cloud and regions of a test point cloud for generation of local density maps, in accordance with an embodiment of the disclosure.

FIG. 9 is a diagram that illustrates selections of regions of a reference point cloud and regions of a test point cloud for generation of local density maps, in accordance with an embodiment of the disclosure. With reference to FIG. 9, there is shown an exemplary scenario 900. In exemplary scenario 900, there is shown a reference point cloud 902 and a test point cloud 904. The reference point cloud 902 may be an uncompressed point cloud of an object such as a human head. The circuitry 202 may reconstruct the test point cloud 904 based on encoded point cloud data that may be obtained after encoding of the reference point cloud 902.

At T-1, the circuitry 202 may select the reference point cloud 902 as reference data and the test point cloud 904 as test data. In accordance with an embodiment, the circuitry 202 may be configured to compute a radius of a sphere 906 based on a number of 3D points in the reference point cloud 902 and a bounding box that encloses all 3D points of the reference point cloud 902. The circuitry 202 may be further configured to compute a volume of the sphere 906 based on the radius of the sphere 906. For example, the center of the sphere 906 may correspond to the 3D location of a 3D point 908. The circuitry 202 may determine a first number of 3D points in neighborhood of the 3D point 908 based on the location of the 3D point 908, the reference data (i.e., the reference point cloud 902), and the radius of the sphere 906. Thereafter, a first local density value at the 3D point 908 may be determined based on the volume of the sphere 906 and the first number of 3D points in the neighborhood of the 3D point 908. Thus, a first local density value at each 3D point of the reference data (i.e., the reference point cloud 902) may be determined based on shifting of the center of the sphere 906 to the 3D location of the corresponding 3D point and determination of a first number of 3D points in neighborhood of corresponding 3D point. The circuitry 202 may be further configured to generate a first local density map of the reference data (i.e., the reference point cloud 902) that may be representative of a local density value at each 3D point of the reference data.

The circuitry 202 may be further configured to determine 3D locations in the test data (i.e., the test point cloud 904) that correspond to the 3D locations of the 3D points in the reference data (i.e., the reference point cloud 402). For example, the 3D location 910 corresponding to the 3D location of the 3D point 908 may be determined. Similarly, other 3D locations in the test data (i.e., the test point cloud 904) corresponding to 3D locations of other 3D points of the reference data (i.e., the reference point cloud 902) may be determined. The circuitry 202 may determine a second number of 3D points in a neighborhood of the 3D location 910 in the test data (i.e., the test point cloud 904). The neighborhood may correspond to a region enclosed by a sphere 912. The second number of 3D points in the neighborhood may be determined based on the 3D location 910, the test data (i.e., the test point cloud 904), and a radius of the sphere 912 (which may be identical to that of the sphere 906). Thereafter, a second local density value at the 3D location 910 may be determined based on the volume of the sphere 912 and the second number of 3D points in the neighborhood of the 3D location 910. Thus, second local density values at other determined 3D locations in the test data (i.e., the test point cloud 904) may be determined. The circuitry 202 may be configured to generate a second local density map of the test data (i.e., the test point cloud 904) that may be representative of a local density value at each 3D location of the test data.

At T-2, the circuitry 202 may select the test point cloud 904 as reference data and the reference point cloud 902 as test data. In accordance with an embodiment, the circuitry 202 may be configured to compute a radius of a sphere 914 based on a number of 3D points in the test point cloud 904 and a bounding box that encloses all 3D points of the test point cloud 904. The circuitry 202 may be further configured to compute a volume of the sphere 914 based on the radius of the sphere 914. For example, the center of the sphere 914 may correspond to the 3D location of a 3D point 916 of the test point cloud 904. The circuitry 202 may determine a third number of 3D points in neighborhood of the 3D point 916 based on the location of the 3D point 916, the reference data (i.e., the test point cloud 904), and the radius of the sphere 914. Thereafter, a third local density value at the 3D point 916 may be determined based on the volume of the sphere 914 and the third number of 3D points in the neighborhood of the 3D point 916. Thus, a third local density value at each 3D point of the reference data (i.e., the test point cloud 904) may be determined based on shifting of the center of the sphere 914 to the 3D location of the corresponding 3D point and determination of a third number of 3D points in neighborhood of corresponding 3D point. The circuitry 202 may be further configured to generate a third local density map of the reference data (i.e., the test point cloud 904) that may be representative of a local density value at each 3D point of the reference data.

The circuitry 202 may be further configured to determine 3D locations in the test data (i.e., the reference point cloud 902) that correspond to the 3D locations of the 3D points in the reference data (i.e., the test point cloud 902). For example, the 3D location 918 corresponding to the 3D location of the 3D point 916 may be determined. Similarly, other 3D locations in the test data (i.e., the reference point cloud 902) corresponding to 3D locations of other 3D points of the reference data (i.e., the test point cloud 904) may be determined. The circuitry 202 may determine a fourth number of 3D points in a neighborhood of the 3D location 918 in the test data (i.e., the reference point cloud 902). The neighborhood may correspond to a region enclosed by a sphere 920. The fourth number of 3D points in the neighborhood may be determined based on the 3D location 918, the test data (i.e., the reference point cloud 902), and a radius of the sphere 920 (which may be identical to that of the sphere 914). Thereafter, a fourth local density value at the 3D location 918 may be determined based on the volume of the sphere 920 and the fourth number of 3D points in the neighborhood of the 3D location 918. Thus, fourth local density values at other determined 3D locations in the test data (i.e., the reference point cloud 902) may be determined. The circuitry 202 may be configured to generate a fourth local density map of the test data (i.e., the reference point cloud 902) that may be representative of a local density value at each 3D location of the test data.

Figure 10:
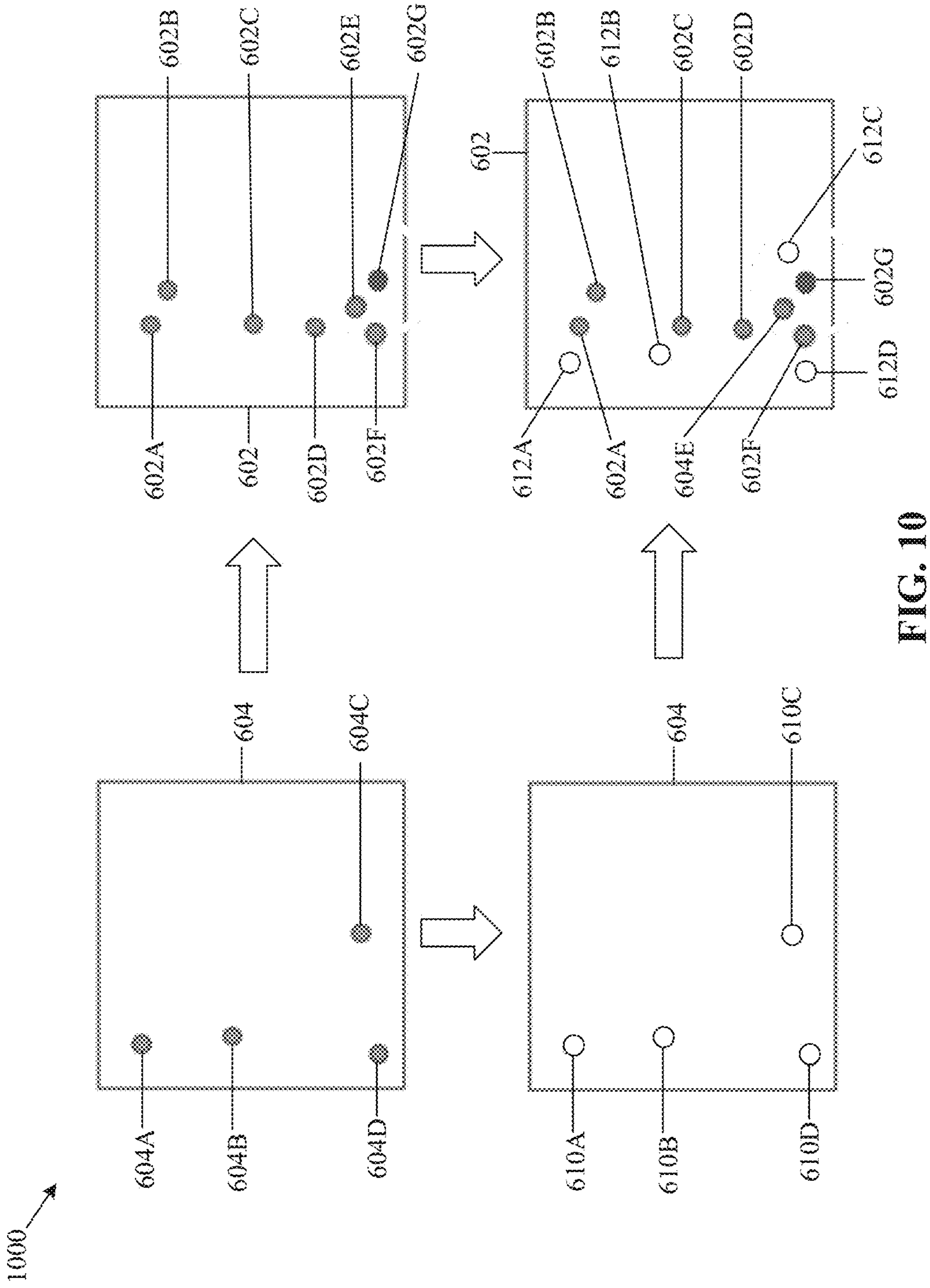
FIG. 10 is a diagram that illustrates an exemplary scenario for computation of a density distortion metric based on local density maps of reference data and test data, in accordance with an embodiment of the disclosure.

FIG. 10 is a diagram that illustrates an exemplary scenario for computation of a density distortion metric based on local density maps of reference data and test data, in accordance with an embodiment of the disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown an exemplary scenario 1000. In exemplary scenario 1000, there are shown 3D points of the reference point cloud 602 and the test point cloud 604 of FIG. 6. During operation, the circuitry 202 may select the test point cloud 604 as reference data and the reference point cloud 602 as test data. There is further shown 3D locations of the 3D points of the test point cloud 604 and 3D locations in the reference point cloud 602 that may correspond to the 3D locations of the 3D points of the test point cloud 604. The circuitry 202 may be configured to generate a third local density map for the test point cloud 604 and a fourth local density map for the reference point cloud 602.

The third local density map of the test point cloud 604 may be representative of local density values at each of the 3D points 604A-604D. To determine the local density values, the circuitry 202 may further determine coordinates (for example, "x", "y", and "z" coordinate values) of 3D locations 610A-610D where the 3D points 604A-604D of the test point cloud 604 may be present. Each 3D location of the 3D locations 610A-610D may be referred as "tes($x_i$,$y_i$,$z_i$)", where "i"ϵ"610A"-610D". The third local density map of the test point cloud 604 may be referred as $LDM_{tes}$={LD_tes($x_i$,$y_i$,$z_i$)|i∈610A-610D}, where "LD_tes($x_i$,$y_i$,$z_i$)" may represent local density value at a 3D location "i" of the test point cloud 604.

The circuitry 202 may further determine 3D locations in the reference point cloud 602 that may correspond to the 3D locations 610A-610D of the 3D points 604A-604D. The determined 3D locations in the reference point cloud 602 may be 3D locations 612A-612D. The coordinates of the 3D locations 612A-612D may be identical to the determined coordinates of the 3D locations 610A-610D. Each of the determined 3D locations 612A-612D of the reference point cloud 602 may be referred using "ref($x_i$,$y_i$,$z_i$)", where "i"ϵ"612A"-"612D".

Once the coordinates of the 3D locations 612A-612D are determined, local density values at the 3D locations 612A-612D may be determined. The fourth local density map of the reference point cloud 602 may be representative of a local density value determined at each 3D location of the 3D locations 612A-612D and may be represented as $LDM_{ref}$={LD_ref($x_i$,$y_i$,$z_i$)|i∈612A-612D}. "LD_ref($x_i$,$y_i$,$z_i$)" may represent local density value at a 3D location "i" in the reference point cloud 602.

The circuitry 202 may be further configured to compute a local density difference values associated with each of the 3D points 604A-604D of the test point cloud 604. For example, a local density difference value associated with the 3D point 604A may be computed based on a difference between local density value at the 3D location 610A (i.e., "LD_tes($x_{610A}$,$y_{610A}$,$z_{610A}$)") and local density value at the 3D location 612A (i.e., "LD_ref($x_{612A}$,$y_{612A}$,$z_{612A}$)"). Similarly, local density difference values associated with the 3D points 604B, 604C, and 604D may be computed. The circuitry 202 may, thus, generate a second difference density map that may be representative of the local density difference values associated with the 3D points 604A-604D, and may obtain, from the difference density map, the local density difference value associated with each of the 3D points 604A-604D. For example, the local density difference value for the 3D point 604A (i.e., LD_tes($x_{610A}$,$y_{610A}$,$z_{610A}$)–LD_ref($x_{612A}$,$y_{612A}$,$z_{612A}$)) may be obtained. Similarly, local density difference values for other 3D points 604B, 604C, and 604D may be obtained. Thereafter, the circuitry 202 may compute a sum of squares of the local density difference values associated the 3D points 604A-604D.

In accordance with an embodiment, the circuitry 202 may be further configured to compute a second MSE based on the third local density map and the fourth local density map. The second MSE may be determined based on the sum of squares of the local density difference values. By way of example, and not limitation, the second MSE may be represented using equation (10), which is given as follows:

$$\text{Second } MSE = \sum_{i=A}^{D} (\text{LD\_tes}(x_{610i}, y_{610i}, z_{610i}) - \text{LD\_ref}(x_{612i}, y_{612i}, z_{612i}))^2 \quad (10)$$

Equation (10) is generalized for a test point cloud that includes "$N_B$" 3D points. The generalized second MSE may be represented using equation (11), which is given as follows:

$$\text{Second } MSE = \sum_{i=1}^{N_B} (\text{LD\_tes}(x_i, y_i, z_i) - \text{LD\_ref}(x_1, y_1, z_1))^2 \quad (11)$$

In accordance with an embodiment, the circuitry 202 compute the value of the density distortion metric ("$D_3$") based on the first MSE, the second MSE, the number of 3D points in the reference point cloud 602 ("$N_A$"), and the number of 3D points in the test point cloud 604 ("$N_B$"). The computation may involve two steps. In the first step, the circuitry 202 may determine a total MSE. For example, the total MSE may be determined using one of the following equations (12), (13), (14), and (15), which are given as follows:

$$\text{Total } MSE = \frac{\text{First } MSE + \text{Second } MSE}{N_A + N_B} \quad (12)$$

$$\text{Total } MSE = \frac{1}{N_A}(\text{First } MSE) + \frac{1}{N_B}(\text{Second } MSE) \quad (13)$$

$$\text{Total } MSE = \frac{\frac{\text{First } MSE}{N_A} + \frac{\text{Second } MSE}{N_B}}{2} \quad (14)$$

$$\text{Total } MSE = \frac{N_A(\text{First } MSE) + N_B(\text{Second } MSE)}{N_A + N_B} \quad (15)$$

In the first step, the circuitry 202 may determine the density distortion metric ("$D_3$") using equation (16) as follows:

$$D_3 = 20\log_{10}\left(\frac{2^{16} - 1}{\sqrt{\text{Total } MSE}}\right) \quad (16)$$

Figure 11:
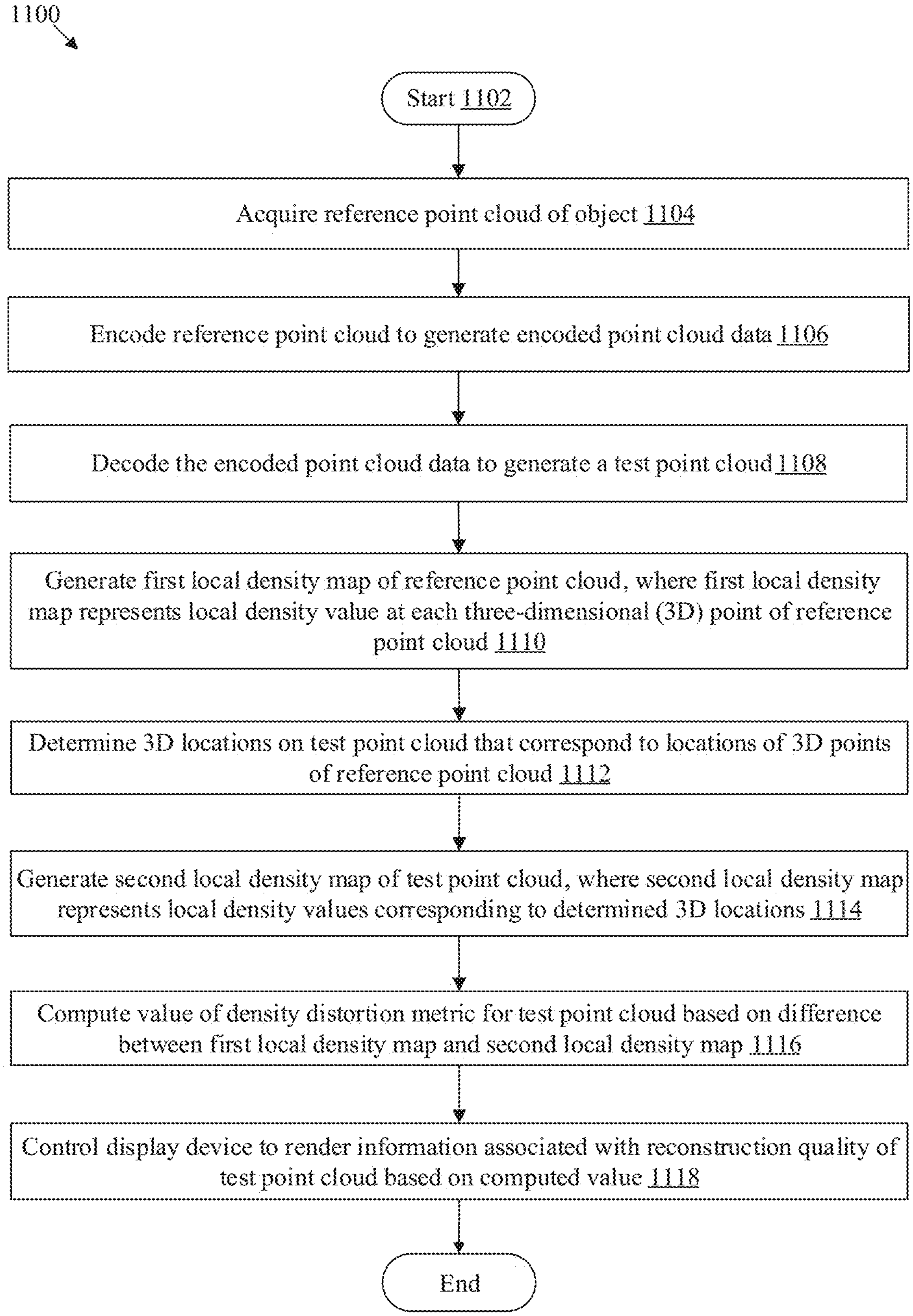
FIG. 11 is a flowchart that illustrates operations for an exemplary method for estimation of density distortion metric for processing of point cloud geometry, in accordance with an embodiment of the disclosure.

FIG. 11 is a flowchart that illustrates operations for an exemplary method for estimation of density distortion metric for processing of point cloud geometry, in accordance with an embodiment of the disclosure. FIG. 11 is explained in conjunction with elements from FIGS. 1, 2, 3, 4, 5, 6, 7A, 7B, 8, 9, and 10. With reference to FIG. 11, there is shown a flowchart 1100. The operations from 1102 to 1118 may be implemented by any computing system, such as, by the electronic device 102, or the circuitry 202 of the electronic device 102, of FIG. 1. The operations may start at 1102 and may proceed to 1104.

At 1104, a reference point cloud 112 of an object, may be acquired. In at least one embodiment, the circuitry 202 may be configured to acquire the reference point cloud 112 of the object. The details of acquisition of the reference point cloud 112 of the object, is described, for example, in FIG. 1.

At 1106, the reference point cloud 112 may be encoded to generate the encoded point cloud data 114. In at least one embodiment, the circuitry 202 may be configured to encode the reference point cloud 112 to generate the encoded point cloud data 114. The details of generation of the encoded point cloud data 114 is described, for example, in FIG. 1.

At 1108, the encoded point cloud data 114 may be decoded to generate the test point cloud 116. In at least one embodiment, the circuitry 202 may be configured to decode the encoded point cloud data 114 to generate the test point cloud 116. The details of generation of the test point cloud 116 based on decoding of the encoded point cloud data 114, is described, for example, in FIG. 1.

At 1110, a first local density map of the reference point cloud 112 may be generated. In at least one embodiment, the circuitry 202 may be configured to generate the first local density map of the reference point cloud 112. The first local density map may represent a local density value at each 3D point of the reference point cloud 112. The details of generation of the first local density map of the reference point cloud 112, are described, for example, in FIG. 1, FIG. 3, FIG. 5, and FIG. 6.

At 1112, 3D locations in the test point cloud 116, that correspond to locations of 3D points of the reference point cloud 112, may be determined. In at least one embodiment, the circuitry 202 may be configured to determine the 3D locations in the test point cloud 116 that correspond to the locations of the 3D points of the reference point cloud 112. The details of determination of the 3D locations in the test point cloud 116, are described, for example, FIG. 1, FIG. 3, FIG. 4, FIG. 5, and FIG. 6.

At 1114, a second local density map of the test point cloud 116 may be generated. In at least one embodiment, the circuitry 202 may be configured to generate the second local density map of the test point cloud 116. The second local density map may represent a local density value at each 3D location of the determined 3D locations in the test point cloud 116. The details of generation of the second local density map of the test point cloud 116, are described, for example, in FIG. 1 FIG. 3, FIG. 4, FIG. 5, and FIG. 6.

At 1116, a value of a density distortion metric for the test point cloud 116 may be computed based on the first local density map and the second local density map. In at least one embodiment, the circuitry 202 may be configured to compute the value of the density distortion metric for the test point cloud 116 based on the first local density map and the second local density map. The details of computation of the density distortion metric, are described, for example, in FIG. 1, FIG. 6, and FIG. 7.

At 1118, a display device may be controlled to render information associated with a reconstruction quality of the test point cloud 116 based on the computed value of the density distortion metric. In at least one embodiment, the circuitry 202 may be configured to control the display device to render information associated with a reconstruction quality of the test point cloud 116 based on the computed value of the density distortion metric. The details of controlling of the display device for rendering the information, are described, for example, in FIG. 1 and FIG. 7. Control may pass to end.

Although the flowchart 1100 is illustrated as discrete operations, such as 1104, 1106, 1108, 1110, 1112, 1114, 1116, and 1118, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include acquisition of a reference point cloud 112 of an object. The operations may further include encoding of the reference point cloud 112 to generate encoded point cloud data 114. The operations may further include decoding of the encoded point cloud data 114 to generate a test point cloud 116. The operations may further include generation of a first local density map of the reference point cloud 112. The first local density map may represent local density value at each 3D point of the reference point cloud 112. The operations may further include determination of 3D locations in the test point cloud 116 that correspond to locations of 3D points of the reference point cloud 112. The operations may further include generation of a second local density map of the test point cloud 116. The second local density map may represent a local density value at each 3D location of the determined 3D locations in the test point cloud 116. The operations may further include computation of a value of a density distortion metric for the test point cloud 116 based on the first local density map and the second local density map. The operations may further include controlling of the display device 104 to render information associated with a reconstruction quality of the test point cloud 116 based on the computed value of the density distortion metric.

Exemplary aspects of the disclosure may include an electronic device (such as, the electronic device 102 of FIG. 1) that may include circuitry (such as the circuitry 202), that may be communicatively coupled to a display device (such as the display device 104 of FIG. 1). The electronic device 102 may further include memory (such as the memory 204 of FIG. 2). The memory 204 may be configured to store a point cloud codec (such as the point cloud codec 110) that includes the machine learning-based encoder 210A and the machine learning-based decoder 210B. The circuitry 202 may be configured to acquire a reference point cloud 112 of an object. The circuitry 202 may be further configured to encode the reference point cloud 112 to generate encoded point cloud data 114. The circuitry 202 may be further configured to decode the encoded point cloud data 114 to generate a test point cloud 116. The circuitry 202 may be further configured to generate a first local density map that represents a local density value at each 3D point of the reference point cloud 112. The circuitry 202 may be further configured to determine 3D locations in the test point cloud 116 that corresponds to locations of 3D points of the reference point cloud 112. The circuitry 202 may be further configured to generate a second local density map of the test point cloud 116 that represents a local density value at each 3D location of the determined 3D locations in the test point cloud 116. The circuitry 202 may be further configured to compute a value of a density distortion metric for the test point cloud 116 based on the first local density map and the second local density map. The circuitry 202 may be further configured to control the display device 104 to render information associated with a reconstruction quality of the test point cloud 116 based on the computed value of the density distortion metric.

In accordance with an embodiment, the circuitry 202 may be further configured to determine a bounding box for the reference point cloud 112. The circuitry 202 may be further configured to determine a number of the 3D points of the reference point cloud 112. The circuitry 202 may be further configured to compute a radius to be used to sample the 3D points of the reference point cloud 112. The first radius may be computed based on the bounding box and the number of the 3D points of the reference point cloud 112. The circuitry 202 may be further configured to compute a spherical volume based on the radius.

In accordance with an embodiment, the circuitry 202 may be further configured to determine, from the 3D points of the reference point cloud 112, a first number of 3D points in a neighborhood of each 3D point of the reference point cloud 112. The first number of 3D points in the neighborhood of each 3D point of the reference point cloud 112 may be determined based on the radius, coordinates of a corresponding 3D point of the reference point cloud 112, and the reference point cloud 112. The circuitry 202 may be further configured to determine the local density value at each 3D point of the reference point cloud 112 based on the spherical volume and the first number of 3D points in the neighborhood of the corresponding 3D point.

In accordance with an embodiment, the circuitry 202 may be further configured to determine, from 3D points of the test point cloud 116, a second number of 3D points in a neighborhood of each 3D point of the determined 3D locations. The second number of 3D points in the neighborhood may be determined based on the radius. The circuitry 202 may be further configured to determine the local density values for the second local density map based on the spherical volume and the second number of 3D points in the neighborhood of a corresponding 3D location of the determined 3D locations.

In accordance with an embodiment, the circuitry 202 may be further configured to quantize each of the first local density map and the second local density map based on a defined number of quantization levels. The value of the density distortion metric may be computed further based on the quantization.

In accordance with an embodiment, the circuitry 202 may be further configured to compute a mean square error based on the first local density map and the second local density map. The value of the density distortion metric may be computed further based on the computed mean square error. The density distortion metric may indicate a PSNR associated with the test point cloud 116.

In accordance with an embodiment, the circuitry 202 may be further configured to select, from a plurality of RD points, an RD point as an optimal rate to be used to encode the reference point cloud 112. The selection may be based on a determination that the computed value of the density distortion metric is above a threshold value.

In accordance with an embodiment, the circuitry 202 may be further configured to train the machine learning-based encoder 210A on a point cloud encoding task based on a first auxiliary loss that uses the computed value of the density distortion metric.

In accordance with an embodiment, the circuitry 202 may be further configured to train the machine learning-based encoder 210A on a point cloud reconstruction task based on a second auxiliary loss that uses the computed value of the density distortion metric.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:

circuitry configured to:

acquire a reference point cloud of an object;

encode the reference point cloud to generate encoded point cloud data;

decode the encoded point cloud data to generate a test point cloud;

generate a first local density map of the reference point cloud, wherein the first local density map represents a local density value at each three-dimensional (3D) point of the reference point cloud;

determine 3D locations in the test point cloud that correspond to locations of 3D points of the reference point cloud, wherein the each 3D point of the reference point cloud corresponds to the 3D points of the reference point cloud;

generate a second local density map of the test point cloud, wherein the second local density map represents a local density value at each 3D location of the determined 3D locations in the test point cloud;

quantize, based on a defined number of quantization levels, each of the first local density map and the second local density map;

compute, based on the quantization, a value of a density distortion metric for the test point cloud; and control, based on the computed value, a display device to render information associated with a reconstruction quality of the test point cloud.

2. The electronic device according to claim 1, wherein the circuitry is further configured to:

determine a bounding box for the reference point cloud;

determine a number of the 3D points in the reference point cloud;

compute a radius to sample the 3D points of the reference point cloud, wherein the radius is computed based on the bounding box and the number of the 3D points in the reference point cloud; and compute a spherical volume based on the radius.

3. The electronic device according to claim 2, wherein the circuitry is further configured to:

determine, from the 3D points of the reference point cloud, a first number of 3D points in a neighborhood of the each 3D point of the reference point cloud, wherein the first number of 3D points is determined based on coordinates of a corresponding 3D point of the reference point cloud, the reference point cloud, and the radius; and determine, based on the spherical volume and the first number of 3D points in the neighborhood of the corresponding 3D point, the local density value at the each 3D point of the reference point cloud.

4. The electronic device according to claim 2, wherein the circuitry is further configured to:

determine, from 3D points of the test point cloud, a second number of 3D points in a neighborhood of the each 3D location of the determined 3D locations in the test point cloud, wherein the second number of 3D points in the neighborhood is determined based on the radius; and determine, based on the spherical volume and the second number of 3D points in the neighborhood of a corresponding 3D location of the determined 3D locations, local density values for the second local density map.

5. The electronic device according to claim 1, wherein the circuitry is further configured to compute a mean square error based on the first local density map and the second local density map, and the value of the density distortion metric is computed further based on the computed mean square error.

6. The electronic device according to claim 1, wherein the density distortion metric indicates a peak signal-to-noise ratio (PSNR) associated with the test point cloud.

7. The electronic device according to claim 1, wherein the circuitry is further configured to select, from a plurality of rate distortion (RD) points, an RD point as an optimal rate to encode the reference point cloud, and the selection is based on a determination that the computed value of the density distortion metric is above a threshold value.

8. The electronic device according to claim 1, further comprising a memory configured to store a point cloud codec that includes a machine learning-based encoder and a machine learning-based decoder.

9. The electronic device according to claim 8, wherein the circuitry is further configured to train, based on a first auxiliary loss that uses the computed value of the density distortion metric, the machine learning-based encoder on a point cloud encoding task.

10. The electronic device according to claim 8, wherein the circuitry is further configured to train, based on a second auxiliary loss that uses the computed value of the density distortion metric, the machine learning-based decoder on a point cloud reconstruction task.

11. The electronic device according to claim 1, wherein the circuitry is further configured to compute a first mean square error based on the first local density map and the second local density map.

12. The electronic device according to claim 11, wherein the circuitry is further configured to:

select the test point cloud as reference data;

select the reference point cloud as test data;

generate a third local density map of the reference data, wherein the third local density map represents a local density value at each 3D point of the reference data;

determine 3D locations in the test data that correspond to locations of 3D points of the reference data, wherein the each 3D point of the reference data corresponds to the 3D points of the reference data;

generate a fourth local density map of the test data, wherein the fourth local density map represents a local density value at each 3D location of the determined 3D locations in the test data; and compute a second mean square error based on the third local density map and the fourth local density map, wherein the value of the density distortion metric is computed further based on the computed first mean square error, the computed second mean square error, a number of the 3D points in the reference point cloud, and a number of 3D points in the test point cloud.

13. The electronic device according to claim 12, wherein the density distortion metric indicates a PSNR associated with the test data.

14. The electronic device according to claim 12, wherein the circuitry is further configured to:

determine a bounding box for the reference data;

determine a number of the 3D points in the reference data; and compute a radius to sample the 3D points of the reference data, wherein the radius is computed based on the bounding box and the number of the 3D points in the reference data; and compute a spherical volume based on the radius.

15. The electronic device according to claim 14, wherein the circuitry is further configured to:

determine, from the 3D points of the reference data, a third number of 3D points in a neighborhood of the each 3D point of the reference data, wherein the third number of 3D points is determined based on coordinates of a corresponding 3D point of the reference data, the reference data, and the radius; and determine, based on the spherical volume and the third number of 3D points in the neighborhood of the corresponding 3D point, a third local density value at the each 3D point of the reference data.

16. The electronic device according to claim 14, wherein the circuitry is further configured to:

determine, from 3D points of the test data, a fourth number of 3D points in a neighborhood of the each 3D location of the determined 3D locations in the test data, wherein the fourth number of 3D points is determined based on the radius; and determine, based on the spherical volume and the fourth number of 3D points in the neighborhood of a corresponding 3D location of the determined 3D locations in the test data, local density values for the fourth local density map.

17. A method, comprising:

in an electronic device:

acquiring a reference point cloud of an object;

encoding the reference point cloud for generating encoded point cloud data;

decoding the encoded point cloud data for generating a test point cloud;

generating a first local density map of the reference point cloud, wherein the first local density map represents a local density value at each three-dimensional (3D) point of the reference point cloud;

determining 3D locations in the test point cloud that correspond to locations of 3D points of the reference point cloud, wherein the each 3D point of the reference point cloud corresponds to the 3D points of the reference point cloud;

generating a second local density map of the test point cloud, wherein the second local density map represents a local density value at each 3D location of the determined 3D locations in the test point cloud;

quantizing, based on a defined number of quantization levels, each of the first local density map and the second local density map;

computing, based on the quantization, a value of a density distortion metric for the test point cloud; and controlling, based on the computed value, a display device to render information associated with a reconstruction quality of the test point cloud.

18. The method according to claim 17, further comprising computing a mean square error based on the first local density map and the second local density map, wherein the value of the density distortion metric is computed further based on the computed mean square error.

19. A non-transitory computer-readable medium having stored thereon, computer-executable instructions that when executed by an electronic device, causes the electronic device to execute operations, the operations comprising:

acquiring a reference point cloud of an object;

encoding the reference point cloud for generating encoded point cloud data;

decoding the encoded point cloud data for generating a test point cloud;

generating a first local density map of the reference point cloud, wherein the first local density map represents a local density value at each three-dimensional (3D) point of the reference point cloud;

determining 3D locations in the test point cloud that correspond to locations of 3D points of the reference point cloud, wherein the each 3D point of the reference point cloud corresponds to the 3D points of the reference point cloud;

generating a second local density map of the test point cloud, wherein the second local density map represents a local density value at each 3D location of the determined 3D locations in the test point cloud;

quantizing, based on a defined number of quantization levels, each of the first local density map and the second local density map;

computing, based on the quantization, a value of a density distortion metric for the test point cloud; and controlling, based on the computed value, a display device to render information associated with a reconstruction quality of the test point cloud.

* * * * *